US012256368B2

(12) United States Patent
Raghavan et al.

(10) Patent No.: US 12,256,368 B2
(45) Date of Patent: Mar. 18, 2025

(54) DYNAMICALLY MANAGING SYSTEM RESOURCES UPON CANCELATION OF A SYMBOL ALLOCATION IN SLOT FORMAT INDICATORS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/178,107

(22) Filed: Feb. 17, 2021

(65) Prior Publication Data
US 2021/0307006 A1     Sep. 30, 2021

Related U.S. Application Data

(60) Provisional application No. 63/000,232, filed on Mar. 26, 2020.

(51) Int. Cl.
*H04W 72/0446*     (2023.01)
*H04W 72/1273*     (2023.01)

(52) U.S. Cl.
CPC ... *H04W 72/0446* (2013.01); *H04W 72/1273* (2013.01)

(58) Field of Classification Search
CPC ......... H04W 72/0446; H04W 72/1273; H04W 72/1289; H04W 72/082; H04L 5/0094; H04L 5/1469; H04L 5/0044
See application file for complete search history.

(56) References Cited

U.S. PATENT DOCUMENTS

| | | | |
|---|---|---|---|
| 11,375,527 B1* | 6/2022 | Eyuboglu | H04W 72/1273 |
| 2012/0063369 A1* | 3/2012 | Lin | H04W 72/082 |
| | | | 370/279 |

(Continued)

OTHER PUBLICATIONS

Apple Inc: "Slot Format Indicator in Group-Common PDCCH", 3GPP Draft, 3GPP TSG-RAN WG1 #91, R1-1720118, Slot Format Indicator in Group-Common PDCCH, V2, 3rd Generation Partnership Project (3GPP), Mobile Competence Centre, 650, Route Des Lucioles, F-06921 Sophia-Antipolis Cedex, vol. RAN WG1, No. Reno, US, Nov. 2, 2017-Dec. 1, 2017, Nov. 18, 2017 (Nov. 18, 2017), XP051369791, 8 Pages, Retrieved from the Internet: URL: http://www.3gpp.org/ftp/tsg%5Fran/WG1%5FRL1/TSGR1%5F91/ Docs/. [retrieved on Nov. 18, 2017] section 2.1.

(Continued)

*Primary Examiner* — Chirag G Shah
(74) *Attorney, Agent, or Firm* — Holland & Hart LLP

(57) ABSTRACT

Methods, systems, and devices for wireless communications are described. A first device (e.g., a user equipment (UE)) may receive a first indication associated with the first device, where the first indication indicates a communication direction for each of a plurality of time periods for a time interval. The first device may receive a second indication for a set of time periods, where the second indication indicates a cancelation of communications at the first device during the set of time periods, and where the second indication is based on a communication direction mismatch between the first indication and a third indication. The first device may communicate with a base station during the time interval based on the first indication and the second indication.

17 Claims, 15 Drawing Sheets

(56) References Cited

U.S. PATENT DOCUMENTS

| | | | |
|---|---|---|---|
| 2016/0198475 A1* | 7/2016 | Uchiyama | H04W 72/0453 370/329 |
| 2016/0234857 A1* | 8/2016 | Chen | H04W 72/1263 |
| 2016/0242038 A1* | 8/2016 | Lei | H04W 72/0446 |
| 2017/0041165 A1* | 2/2017 | Cheng | H04L 5/14 |
| 2018/0324715 A1* | 11/2018 | Ryoo | H04W 72/0406 |
| 2019/0104536 A1* | 4/2019 | Wang | H04W 72/1268 |
| 2019/0261454 A1* | 8/2019 | Xiong | H04W 72/0446 |
| 2020/0037305 A1 | 1/2020 | Yang et al. | |
| 2020/0153672 A1* | 5/2020 | Choi | H04W 72/0453 |
| 2020/0351897 A1* | 11/2020 | Fakoorian | H04W 72/0446 |
| 2021/0329623 A1* | 10/2021 | Yoshioka | H04W 72/0413 |
| 2021/0376894 A1* | 12/2021 | Cha | H04L 5/0094 |
| 2022/0029761 A1* | 1/2022 | Su | H04W 72/04 |

OTHER PUBLICATIONS

International Search Report and Written Opinion—PCT/US2021/018530—ISA/EPO—Jun. 11, 2021.

LG Electronics: "Discussion on Mechanism for NR RIM Support", 3GPP Draft, 3GPP TSG RAN WG1 Meeting #95, R1-1812570, Discussion on Mechanism for NR RIM Support Clean, 3rd Generation Partnership Project (3GPP), Mobile Competence Centre, 650, Route Des Lucioles, F-06921 Sophia-Antipolis Cedex, vol. RAN WG1, No. Spokane, USA, Nov. 12, 2018-Nov. 16, 2018, Nov. 3, 2018 (Nov. 3, 2018), XP051478800, 7 Pages, Retrieved from the Internet: URL: http://www.3gpp.org/ftp/tsg%5Fran/WG1%5FRL1/TSGR1%5F95/Docs/R1%2D1812570%2Ezip. [retrieved on Nov. 3, 2018] section 2.1; figure 3.

TCL Communication: "Dynamic TDD—SFI Handling and Interference Management", 3GPP, 3GPP TSG RAN WG1 Meeting #91, Tdoc: R1-1719706, Reno, Nevada, USA, Nov. 27-Dec. 1, 2017, Dec. 1, 2017, 5 Pages, XP051368862, Retrieved from the Internet: URL: http://www.3gpp.org/ftp/tsg%5Fran/WG1%5FRL1/TSGR1%5F91/Docs/. [retrieved on Nov. 17, 2017] section 2.2 figures 1,2.

* cited by examiner

DYNAMICALLY MANAGING SYSTEM RESOURCES UPON CANCELATION OF A SYMBOL ALLOCATION IN SLOT FORMAT INDICATORS

CROSS REFERENCE

The present Application for Patent claims the benefit of U.S. Provisional Patent Application No. 63/000,232 by RAGHAVAN et al., entitled "DYNAMICALLY MANAGING SYSTEM RESOURCES UPON CANCELATION OF A SYMBOL ALLOCATION IN SLOT FORMAT INDICATORS," filed Mar. 26, 2020, assigned to the assignee hereof, and expressly incorporated by reference herein.

FIELD OF TECHNOLOGY

The following relates generally to wireless communications and more specifically to dynamically indicating a communication cancelation, overwriting or preemption.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Operational modes, dynamic system conditions, or changes in network topology may increase interference in wireless communications systems. In some cases, a resource allocation mismatch may be associated with interference at a user equipment UE.

SUMMARY

The described techniques relate to improved methods, systems, devices, and apparatuses that support dynamically managing system resources upon cancelation of a symbol allocation in slot format indicators. Generally, the described techniques provide for interference mitigation based on a first slot format indication (SFI) (e.g., a first indication) and a cancelation indication (e.g., a second indication). For example, a base station may allocate or assign an SFI to a device (e.g., a user equipment (UE)), and the UE may communicate with the base station based on the SFI. In some cases, the base station may identify a mismatch (e.g., a communication direction mismatch at a symbol level) between the first SFI and a second SFI, and in some cases, the base station may determine that the mismatch is associated with cross-link interference from the uplink transmissions on the downlink reception. In some cases, the second SFI may be associated with the same first UE, while in some additional or alternative cases, the second SFI may be associated with a second UE. The base station may transmit a cancelation or overwriting indication altering the resource allocation for one or more symbols (e.g., one or more time periods) associated with the UE, and the UE may communicate with the base station based on the cancelation or overwriting indication and the first SFI.

A method of wireless communication at a first device is described. The method may include receiving a first indication associated with the first device, where the first indication indicates a communication direction for the first device for each of a set of time periods for a time interval, receiving a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicating with a base station during the time interval based on the first indication and the second indication.

An apparatus for wireless communication at a first device is described. The apparatus may include a processor, memory coupled with the processor, and instructions stored in the memory. The instructions may be executable by the processor to cause the apparatus to receive a first indication associated with the first device, where the first indication indicates a communication direction for the first device for each of a set of time periods for a time interval, receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with a base station during the time interval based on the first indication and the second indication.

Another apparatus for wireless communication at a first device is described. The apparatus may include means for receiving a first indication associated with the first device, where the first indication indicates a communication direction for the first device for each of a set of time periods for a time interval, receiving a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicating with a base station during the time interval based on the first indication and the second indication.

A non-transitory computer-readable medium storing code for wireless communication at a first device is described. The code may include instructions executable by a processor to receive a first indication associated with the first device, where the first indication indicates a communication direction for the first device for each of a set of time periods for a time interval, receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with a base station during the time interval based on the first indication and the second indication.

In some examples of the method, apparatuses, and non-transitory computer-readable medium described herein, the third indication may be associated with a second device.

In some examples of the method, apparatuses, and non-transitory computer-readable medium described herein, the second indication may be further based on a beam switch associated with the second device for the set of time periods.

In some examples of the method, apparatuses, and non-transitory computer-readable medium described herein, the first indication may be associated with a first band of the first device, and where the third indication may be associated with a second band of the first device.

In some examples of the method, apparatuses, and non-transitory computer-readable medium described herein, the second indication may be further based on a self-interference condition at the first device for at least the set of time periods.

In some examples of the method, apparatuses, and non-transitory computer-readable medium described herein, the self-interference condition at the first device includes interference between an uplink transmission on the first band and a downlink transmission on the second band for at least the set of time periods, and where the second indication indicates a cancelation of the uplink transmission on the first band for at least the set of time periods.

Some examples of the method, apparatuses, and non-transitory computer-readable medium described herein may further include operations, features, means, or instructions for receiving a grant scheduling downlink transmissions on the second band for at least the set of time periods based on the second indication.

In some examples of the method, apparatuses, and non-transitory computer-readable medium described herein, the set of time periods includes a set of symbols, and where the time interval includes a slot.

In some examples of the method, apparatuses, and non-transitory computer-readable medium described herein, the communication direction for the first device includes an uplink direction, a downlink direction, a flexible symbol, or a gap symbol.

In some examples of the method, apparatuses, and non-transitory computer-readable medium described herein, the communication direction mismatch includes an uplink direction indicated by the first indication for the set of time periods and a downlink direction indicated by the third indication for the set of time periods.

A method of wireless communication at a base station is described. The method may include transmitting a first indication to a first device, where the first indication indicates a communication direction for the first device for each of a set of time periods for a time interval, transmitting a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicating with the first device during the time interval based on the first indication and the second indication.

An apparatus for wireless communication at a base station is described. The apparatus may include a processor, memory coupled with the processor, and instructions stored in the memory. The instructions may be executable by the processor to cause the apparatus to transmit a first indication to a first device, where the first indication indicates a communication direction for the first device for each of a set of time periods for a time interval, transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with the first device during the time interval based on the first indication and the second indication.

Another apparatus for wireless communication at a base station is described. The apparatus may include means for transmitting a first indication to a first device, where the first indication indicates a communication direction for the first device for each of a set of time periods for a time interval, transmitting a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicating with the first device during the time interval based on the first indication and the second indication.

A non-transitory computer-readable medium storing code for wireless communication at a base station is described. The code may include instructions executable by a processor to transmit a first indication to a first device, where the first indication indicates a communication direction for the first device for each of a set of time periods for a time interval, transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with the first device during the time interval based on the first indication and the second indication.

In some examples of the method, apparatuses, and non-transitory computer-readable medium described herein, the third indication may be associated with a second device.

Some examples of the method, apparatuses, and non-transitory computer-readable medium described herein may further include operations, features, means, or instructions for receiving a request for a beam change from the second device, and granting the request for the beam change for the second device, where transmitting the second indication to the first device may be based on granting the request for the beam change for the second device.

In some examples of the method, apparatuses, and non-transitory computer-readable medium described herein, the first indication may be associated with a first band of the first device, and where the third indication may be associated with a second band of the first device.

In some examples of the method, apparatuses, and non-transitory computer-readable medium described herein, the second indication may be further based on a self-interference condition at the first device for at least the set of time periods.

In some examples of the method, apparatuses, and non-transitory computer-readable medium described herein, the self-interference condition at the first device includes interference between an uplink transmission on the first band and a downlink transmission on the second band for at least the set of time periods, and where the second indication indicates a cancelation of the uplink transmission on the first band for at least the set of time periods.

Some examples of the method, apparatuses, and non-transitory computer-readable medium described herein may further include operations, features, means, or instructions for transmitting a grant to the first device scheduling downlink transmissions on the second band for at least the set of time periods based on the second indication.

In some examples of the method, apparatuses, and non-transitory computer-readable medium described herein, the set of time periods includes a set of symbols, and where the time interval includes a slot.

In some examples of the method, apparatuses, and non-transitory computer-readable medium described herein, the communication direction for the first device includes an uplink direction, a downlink direction, a flexible symbol, or a gap symbol.

In some examples of the method, apparatuses, and non-transitory computer-readable medium described herein, the communication direction mismatch includes an uplink direction indicated by the first indication for the set of time periods and a downlink direction indicated by the third indication for the set of time periods.

DETAILED DESCRIPTION

Figure 1:
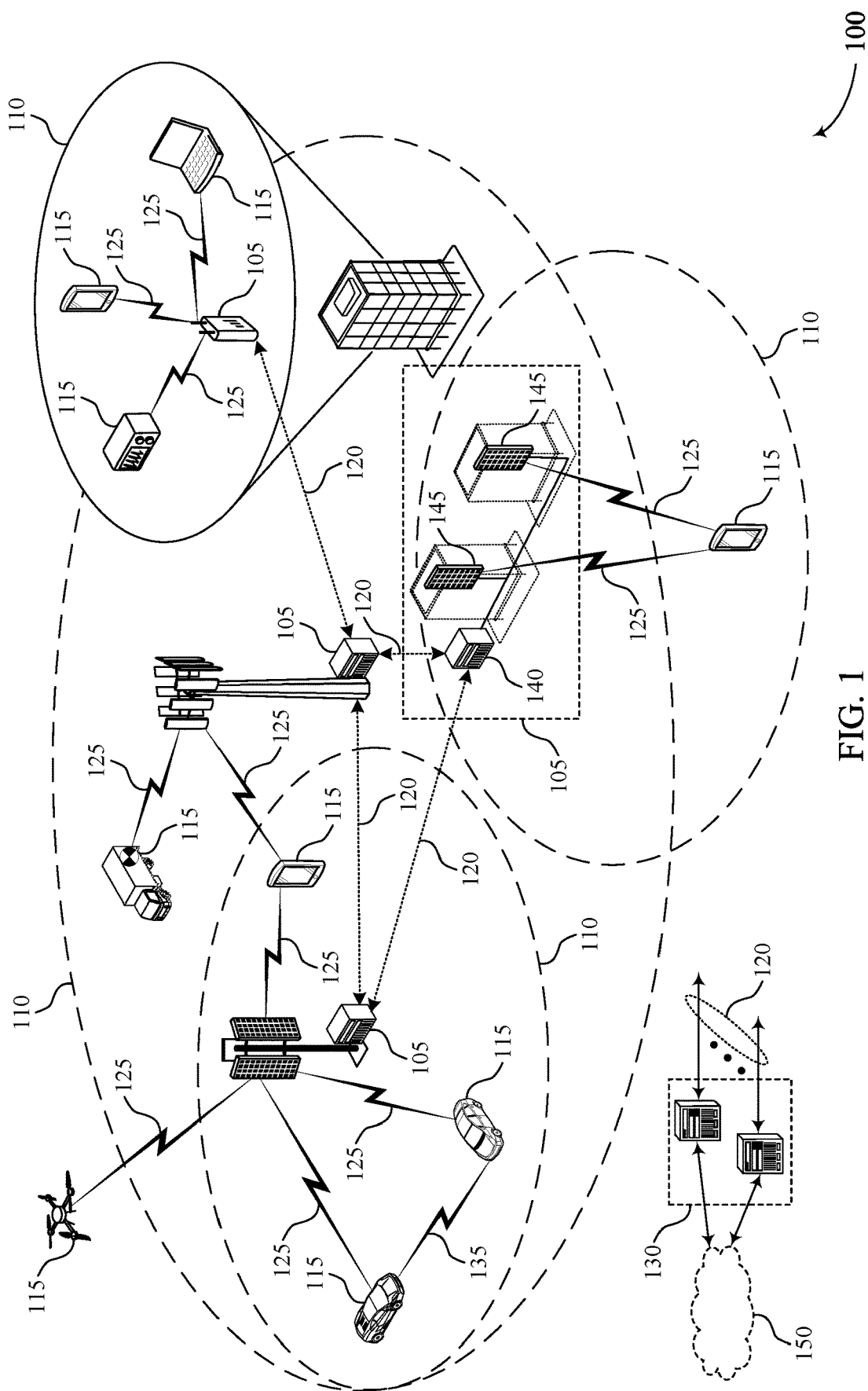
FIG. 1 illustrates an example of a system for wireless communications that supports indicating communication cancelation based on communication direction indications in accordance with aspects of the present disclosure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). In some cases, a communication direction mismatch between multiple slot format indications (SFIs) may impose or be otherwise associated with interference at a user equipment (UE) or a base station. Operational modes, dynamic system conditions, or changes in network topology may increase the amount of interference in wireless communications systems. For example, a UE may operate in a full-duplex mode, and the UE may encounter self-interference (e.g., clutter reflection). In some additional or alternative examples, a UE may encounter interference as the result of a physical obstruction, or a UE may encounter cross-link interference due to another UE. An indication such as an SFI may be used to indicate a communication direction (e.g., uplink direction, downlink direction, or a flexible communication direction) for each time period of a plurality of time periods (e.g., for each orthogonal frequency division multiplexing (OFDM) symbol within a slot). In some cases, interference may be based on or associated with a communication direction mismatch between two or more SFIs (e.g., between one or more symbols within a slot). For example, a first SFI may indicate a downlink direction for a time period for a first UE, and a second SFI may indicate an uplink direction for the time period for a second UE. In some cases, the first UE and/or the second UE may encounter, impose, or receive interference based on the communication direction mismatch.

According to aspects described herein, a UE may communicate with a base station based on a first SFI and a cancelation or overwriting indication may be issued to reduce system interference. For example, a base station may allocate or assign an SFI to a UE, and the UE may communicate with the base station based on the SFI. In some cases, the base station may identify a communication direction mismatch (e.g., a mismatch for one or more symbols) between the first SFI and a second SFI, and the base station may additionally determine that the communication direction mismatch is associated with increased cross-link interference or a potential for increased interference at the UE. In some cases, the second SFI may be associated with the UE, while in some additional or alternative cases, the second SFI may be associated with a second UE. The base station may transmit a cancelation or overwriting indication altering the resource allocation for one or more time periods (e.g., one or more symbols) to the UE, and the UE may communicate with the base station based on the cancelation or overwriting indication and the first SFI.

In some cases, a UE may receive a cancelation or overwriting indication indicating a cancelation of communications for one or more time periods (e.g., symbols). For example, a UE may receive a cancelation indication indicating a cancelation of communications in a time period associated with symbol index 0 of a first SFI. In some additional or alternative examples, a UE may receive a cancelation indication indicating a cancelation of communications in multiple time periods, for example time periods associated with symbol indices 0, 2, and 3 of the first SFI. Communicating based on the first SFI and the cancelation indication may reduce interference and improve achievable rates (e.g., bit error rates, block error rates, etc.).

While one or more techniques described herein may be described in the context of one or more UEs, one having ordinary skill in the art would understand that the one or more UEs are described merely as an example of a device, and that the one or more techniques described herein may be similarly described in the context of any other device or devices.

Aspects of the disclosure are initially described in the context of wireless communications systems. Aspects of the disclosure are further described with respect to an additional wireless communications system and a process flow diagram. Aspects of the disclosure are further illustrated by and described with reference to apparatus diagrams, system diagrams, and flowcharts that relate to indicating communication cancelation based on communication direction indications.

FIG. 1 illustrates an example of a wireless communications system 100 that supports indicating communication cancelation based on communication direction indications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a base station 105 during time intervals (e.g., slots). In some cases, a base station 105 may transmit an indication such as a SFI to a UE 115, and the UE 115 may communicate with the base station 105 based on the SFI. A base station may identify interference or a potential for interference at the UE 115 (e.g., based on a communication direction mismatch between the transmitted SFI and another SFI for the UE 115 or for a different UE 115). The base station 105 may transmit a cancelation indication to the UE 115 based on identifying the interference from the two SFIs, and the UE 115 may communicate with the base station 105 based on the cancelation indication and the first SFI. In some cases, a UE 115 may transmit a preemption indication to a base station 105, and the base station 105 may transmit a cancelation indication based on the preemption indication.

According to some aspects, a UE 115 may communicate with a base station 105 based on a receiving a first SFI and a cancelation indication, and communicating based on the first SFI and the cancelation indication may reduce interference at the UE 115. Communicating based on the first SFI and the cancelation indication may additionally or alternatively improve resource efficiency. For example, an SFI may contain a number of time periods (e.g., 14 symbols), and one or more of the time periods may be associated with interference. A cancelation indication may reduce interference by adjusting or eliminating communication during the one or more time periods that are associated with interference while maintaining communication during the remaining time periods.

Figure 2:
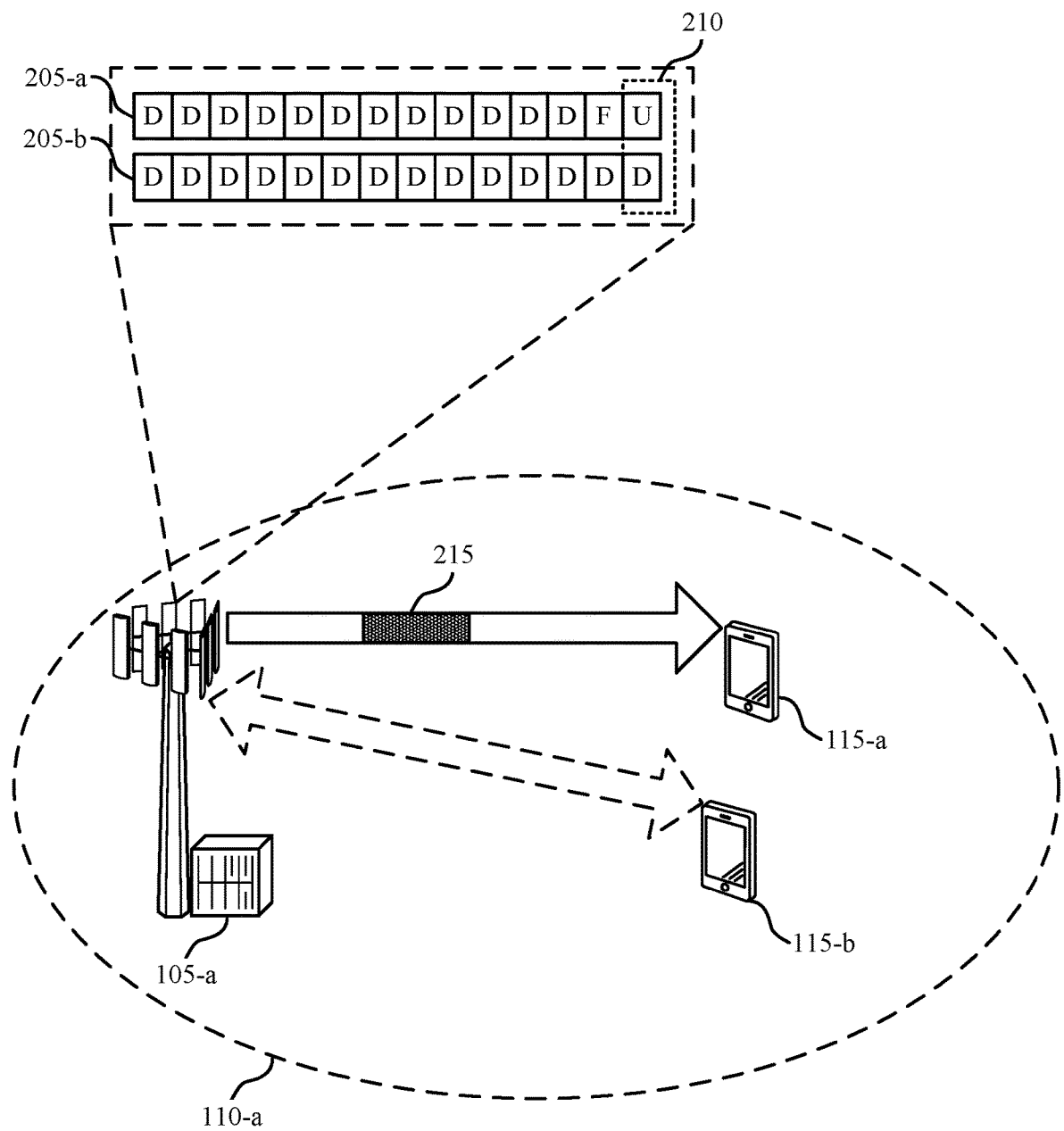
FIG. 2 illustrates an example of a wireless communications system 200 that supports indicating communication cancelation based on communication direction indications in accordance with aspects of the present disclosure.

FIG. 2 illustrates an example of a wireless communications system 200 that supports indicating communication cancelation based on communication direction indications in accordance with aspects of the present disclosure. In some examples, the wireless communications system 200 may implement aspects of wireless communication system 100, as described with reference to FIG. 1. The wireless communications system 200 includes base station 105-a, UE 115-a, and UE 115-b. Generally, the wireless communication system 200 illustrates an example where base station 105-a may transmit an indication 215 (e.g., a cancelation indication, a preemption indication, etc.) based on one or more (SFIs) 205.

In some cases, the wireless communications systems may be prone to interference at a UE (e.g., UE 115-a and/or UE 115-b). For example, UE 115-a may experience interference, and the interference may be self-imposed (e.g., self-interference, clutter or local scattering around the UE, etc.) and/or associated with UE 115-b (e.g., cross-link interference). In some cases, canceling or changing the scheduling for an entire time interval (e.g., a slot) may yield inefficient resource usage, and altering the communication direction for one or more time periods (e.g., symbols) of an SFI 205 may increase system interference. This may be especially problematic with a large number of UEs to serve in the cell and changing SFIs across multiple UEs leads to coordination problems.

Base station 105-a may communicate with a number of UEs 115, and base station 105-a may transmit an SFI 205 to a UE 115. In some examples, SFI 205-a may be associated with UE 115-a and SFI 205-b may be associated with UE 115-b. In some additional or alternative examples, SFI 205-a and SFI 205-b may both be associated with UE 115-a (e.g., the UE 115-a and/or the base station 105-a may be operating in a full duplex mode such that the SFI 205-a is associated with a first band of the UE 115-a and the SFI 205-b is associated with a second band of the UE 115-a). An SFI 205 may be associated with a specific set of resources (e.g., a beam, a channel, a channel group, etc.). In some cases, SFI 205-a and SFI 205-b may indicate a mismatch in symbol 210 (e.g., a communication direction mismatch) for one or more time periods. For example, SFI 205-a may indicate a communication direction of uplink for symbol 210 whereas SFI 205-b may indicate a communication direction of downlink for symbol 210. Base station 105-a may transmit an indication 215 (e.g., a cancelation or overwriting indication) to UE 115-a based on the mismatch in symbol 210. The indication 215 may indicate one or more time periods for UE 115-a to refrain from communicating. The indication 215 may additionally indicate a communication direction for the UE 115-a to refrain from using during the one or more time periods. UE 115-a may communicate with base station 105-a based on SFI 205-a and the indication 215. The methods and procedures described herein may improve system efficiency, support dynamic resource adjustment, and decrease transmission interference.

UE 115-a may operate in a full-duplex mode, and base station 105-a may additionally operate in a full-duplex mode. As such, the UE 115-a and the base station 105-a may be capable of transmitting and receiving in a same time period. In some cases, SFI 205-a may be associated with a first band of UE 115-a and SFI 205-b may be associated with a second band of UE 115-a. UE 115-a may communicate with base station 105-a based on SFI 205-a and SFI 205-b, and in some examples, UE 115-a may experience or be susceptible to interference. In some cases, the interference (e.g., clutter corresponding to local reflection or scattering) may be based on a communication direction mismatch in symbol 210 (or a set of time periods). Base station 105-a may transmit the indication 215 (e.g., a cancelation or overwriting indication) to UE 115-a based on the mismatch in symbol 210. In some cases, base station 105-a may determine that UE 115-a is prone to an interference level that meets a threshold, and base station 105-a may transmit the indication 215 based on the determination. In some examples, UE 115-a may measure and report interference levels to base station 105-a, and the base station 105-a may transmit the indication 215 based on the reported interference levels. For example, base station 105-a may transmit the indication 215 based on a total level of interference, a change in interference, a timing of interference, a location of interference, or any combination thereof. In some additional or alternative cases, UE 115-a may transmit a preemption indication to base station 105-a, and base station 105-a may transmit the indication 215 based on the preemption indication. The preemption indication may provide a list of preferred or non-preferred SFIs to the base station based on the UE's instantaneous use-cases and may be based on an interference measurement, signal strength, or network characteristics, or any combination thereof.

UE 115-a may receive the indication 215 and communicate with base station 105-a based on the indication 215 as well as SFI 205-a and SFI 205-b. For example, base station 105-a may transmit a cancelation or overwriting indication to UE 115-a, and the cancelation indication may indicate symbols that the UE should refrain from using for communicating with base station 105-a. Base station 105-a may transmit the indication 215 to UE 115-a, and the indication 215 may indicate that UE 115-a should refrain from communicating (e.g., transmitting, receiving, etc.) during the symbol at index 13 of SFI 205-a. In some cases, the indication 215 may indicate multiple symbols and/or multiple bands. For example, the indication 215 may indicate that UE 115-a should refrain from communicating with base station 105-a during symbols at indices 12 and 13 for both SFI 205-a and SFI 205-b. In some cases, the indication 215 may reduce the interference at UE 115-a by supporting precise resource allocation adjustments.

In some cases, base station 105-a may pre-allocate SFI 205-a to a full duplex capable UE 115-a on a first band and SFI 205-b to UE 115-a on a second band. UE 115-a may perform uplink transmissions on a first band, but not receive downlink transmission on a second band simultaneously due to clutter and/or self-interference. Base station 105-a may transmit an indication 215 to cancel the first band and/or the second band transmissions (e.g., uplink transmission, downlink transmissions, flexible or gap symbol transmission) on one or more symbols. UE 115-a may communicate with base station 105-a based on the indication 215. In some cases, since uplink transmissions on the first band are canceled, downlink reception on the second band may be feasible upon cancelation. Base station 105-a may schedule one or more downlink transmissions on the second band for UE 115-a. In some cases, base station 105-a may schedule the one or more downlink transmissions on the second band based on the indication 215 and/or SFI 205-b.

Base station 105-a may communicate with multiple UEs 115 in the cell. In some cases, SFI 205-a may be associated with UE 115-a and SFI 205-b may be associated with UE 115-b. The SFIs 205 may be allocated to a number of UEs 115 a priori. For example, an SFI may be associated with a time interval (e.g., a slot), and the SFI may be transmitted to a UE 115 a number of slots before the associated time interval. In some cases, interference or a potential for interference may be associated with a communication direction mismatch for a set of time periods indicated by SFI 205-a and SFI 205-b (e.g., the communication direction mismatch indicated in symbol 210). In some additional or alternative cases, interference may be associated with dynamic interactions and/or dynamic channel conditions. In some cases, a mismatch in symbol 210 (e.g., a symbol mismatch, a communication direction mismatch, etc.) may, at the time of allocating or transmitting the SFI 205-a and SFI 205-b, not cause interference between UE 115-a and UE 115-b. For example, SFI 205-a may indicate an uplink communication direction for UE 115-a during symbol 210, and SFI 205-b may indicate a downlink communication direction for UE 115-b during symbol 210, and UE 115-a and UE 115-b may both communicate during the symbol 210 if the UEs 115 chose beam directions (or were allocated beam directions) that do not interfere with each other during symbol 210. A communication direction mismatch during a symbol 210 (or multiple symbols or time periods) may be considered benign when an interference measurement for that time period fails to meet a threshold, when a signal strength threshold is met, when a receive power threshold is met, or the like.

However, in some cases, a mismatch during a symbol 210 may be associated with interference. For example, UE 115-b may encounter a signal fade due to Doppler/mobility and/or blockage (e.g., hand or body, humans, vehicles, buildings, objects in the local environment, etc.). The signal fade and/or blockage may be associated with a decrease in beam quality, a drop in signal strength, a drop in reference signal received power, a speed of device movement, an angular spread, a Doppler effect, or any combination thereof. UE 115-b may transmit a beam change request to base station 105-a, and the base station 105-a may grant the beam change request. In some cases, the beam change may increase interference and/or decrease the quality of service (QoS) at UE 115-a. For example, UE 115-a may experience cross link interference (or may anticipate cross link interference) as UE 115-b communicates on the new beam as a result of the beam change request. In some cases, base station 105-a may transmit the indication 215 to UE 115-a to reduce the interference and increase the QoS at UE 115-a. For example, upon granting the beam change request to UE 115-b, base station 105-a may determine that an anticipated interference level meets a threshold (e.g., for one or more time periods for which there is a communication direction mismatch between SFI 205-a and SFI 205-b), and base station 105-a may transmit the indication 215 to mitigate the anticipated interference. In some additional or alternative examples, base station 105-a may transmit the indication 215 based on a preemption indication received from UE 115-a or UE 115-b. The indication 215 may mitigate interference associated with a mismatch during a symbol 210 (or a set of symbols). Wireless communications system 200 may thereby reduce system interference in a dynamic communications environment.

Figure 3:
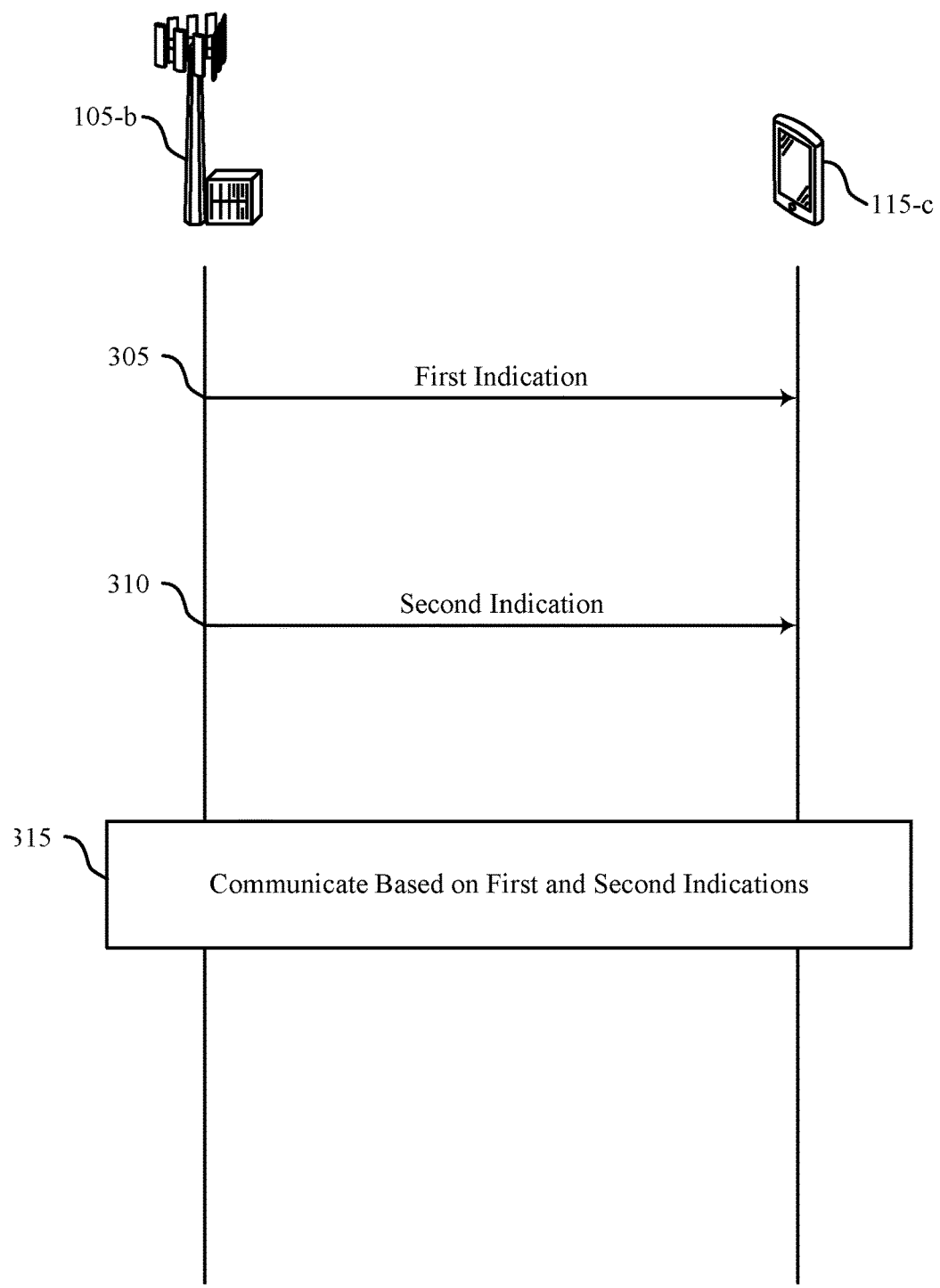
FIG. 3 illustrates an example of a process flow 300 that supports indicating communication cancelation based on communication direction indications in accordance with aspects of the present disclosure.

FIG. 3 illustrates an example of a process flow 300 that supports indicating communication cancelation based on communication direction indications in accordance with aspects of the present disclosure. The process flow 300 includes base station 105-b and UE 115-c. These may be examples of the corresponding devices as described with reference to FIGS. 1 and 2. In some cases, indicating a communication cancelation based on communication direction indications may reduce interference and improve the efficiency of resource usage. Alternative examples of the following may be implemented, where some steps are performed in a different order than described or are not performed at all. In some cases, steps may include additional features not mentioned below, or further steps may be added.

At 305, base station 105-b may transmit a first indication to UE 115-c. UE 115-c may receive the first indication, and the first indication may include or be otherwise associated with a first SFI. The first SFI may indicate a communication direction for UE 115-c for each of a plurality of time periods (e.g., a plurality of symbols) for a time interval (e.g., a slot). A communication direction may, for example, be uplink, downlink, or flexible.

At 310, base station 105-b may transmit a second indication (e.g., a cancelation indication) for a set of time periods (e.g., mismatched symbols, interfering symbols) of the plurality of time periods to UE 115-c. UE 115-c may receive the second indication, and the second indication may indicate a cancelation of communications at UE 115-c during the set of time periods. In some cases, the second indication may be based on a communication direction mismatch for at least the set of time periods between the first indication and a third indication (e.g., a second SFI) that indicates a communication direction for each of the plurality of time periods for the time interval. For example, the first indication may be associated with a first band of UE 115-c and the third indication may be associated with a second band of UE 115-c. Additionally or alternatively, the first indication may be associated with a first UE (e.g., UE 115-c) and the third indication may be associated with a second UE (not shown). The first indication may indicate an uplink communication direction for a time period associated with index 0 (e.g., the first symbol within a slot), and the third indication may indicate a downlink communication direction for the time period associated with index 0. In some cases, the first indication indicating an uplink communication direction for a time period and the third indication indicating a downlink communication direction for the time period may be considered a communication direction mismatch, and base station 105-b may transmit the second indication (e.g., the cancelation indication) based on the mismatch.

At 315, base station 105-b and UE 115-c may communicate during the time interval based on the first indication and the second indication. For example, the second indication may cancel an uplink transmission during a time period (e.g., symbol) at index 0 of the SFI associated with the first indication, and UE 115-c may refrain from transmitting data to base station 105-b during the first time period. In an additional or alternative example, the second indication may cancel a downlink transmission during a time period at index 1 of the SFI associated with the first indication, and UE 115-c may refrain from receiving data from base station 105-b during the time period associated with index 1.

Figure 4:
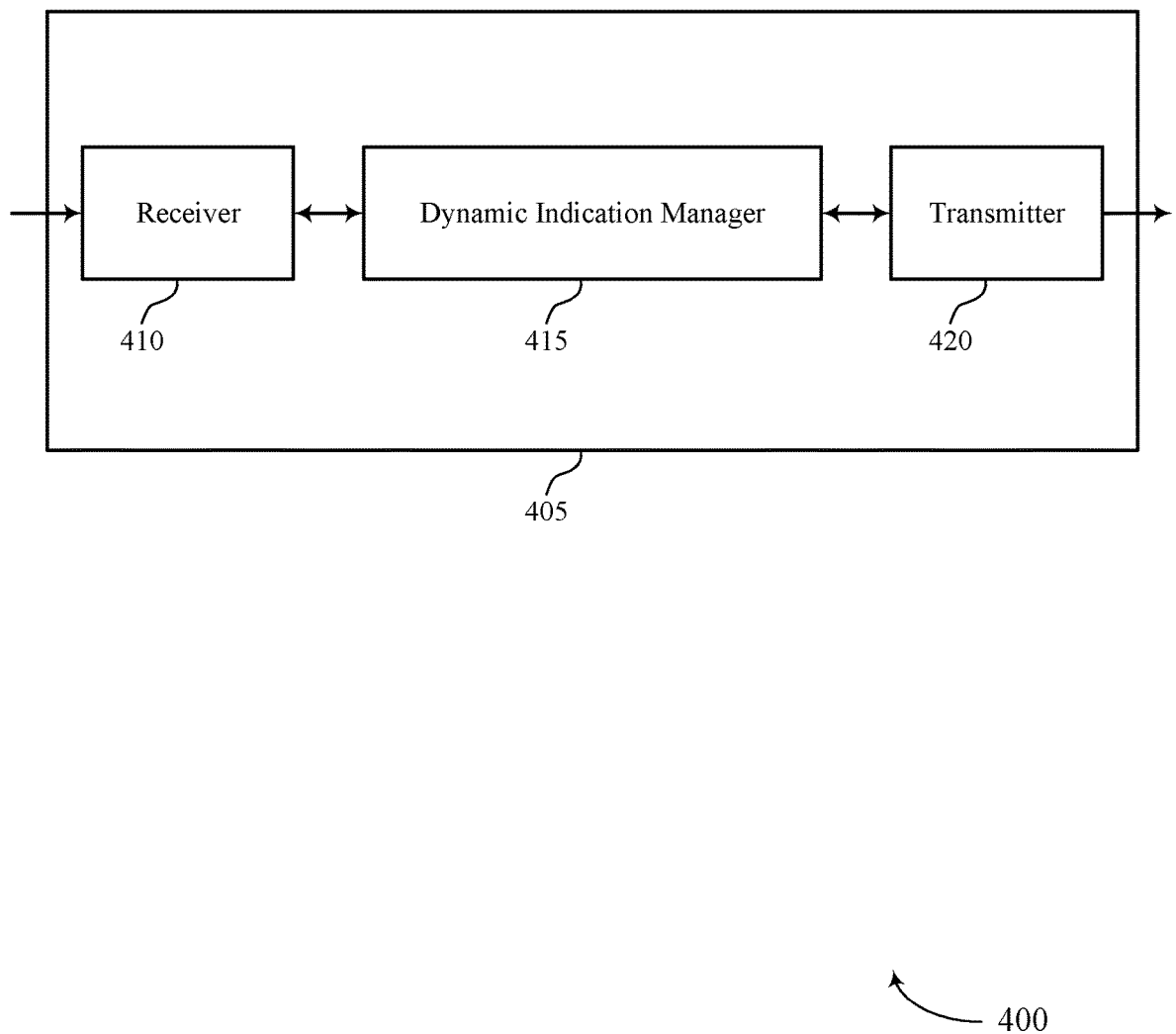
FIGS. 4 and 5 show block diagrams of devices that support indicating communication cancelation based on communication direction indications in accordance with aspects of the present disclosure.

FIG. 4 shows a block diagram 400 of a device 405 that supports indicating communication cancelation based on communication direction indications in accordance with aspects of the present disclosure. The device 405 may be an example of aspects of a UE 115 as described herein. The device 405 may include a receiver 410, a dynamic indication manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to indicating communication cancelation based on communication direction indications, etc.). Information may be passed on to other components of the device 405. The receiver 410 may be an example of aspects of the transceiver 720 described with reference to FIG. 7. The receiver 410 may utilize a single antenna or a set of antennas.

The dynamic indication manager 415 may receive a first indication associated with the first device, where the first indication indicates a communication direction for the first device for each of a set of time periods for a time interval, receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with a base station during the time interval based on the first indication and the second indication. The dynamic indication manager 415 may be an example of aspects of the dynamic indication manager 710 described herein.

The dynamic indication manager 415, or its sub-components, may be implemented in hardware, code (e.g., software or firmware) executed by a processor, or any combination thereof. If implemented in code executed by a processor, the functions of the dynamic indication manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The dynamic indication manager 415, or its sub-components, may be physically located at various positions, including being distributed such that portions of functions are implemented at different physical locations by one or more physical components. In some examples, the dynamic indication manager 415, or its sub-components, may be a separate and distinct component in accordance with various aspects of the present disclosure. In some examples, the dynamic indication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the dynamic indication manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by the dynamic indication manager 415 as described herein may be implemented to realize one or more potential advantages. One implementation may allow a device (e.g., a UE 115) to save power and increase battery life by mitigating interference in downlink and uplink transmissions to and from the UE 115. The dynamic indication manager 415 may effectively organize communications to and from the UE 115 to mitigate cross link interference (CLI) and/or self interference, which may therefore decrease the number of retransmissions to and from the UE 115, which may save power and increase battery life. By including or configuring the dynamic indication manager 415 in accordance with examples as described herein, the device 405 (e.g., a processor controlling or otherwise coupled to the receiver 410, the transmitter 420, the dynamic indication manager 415, or a combination thereof) may support techniques for reduced processing, reduced power consumption, more efficient utilization of communication resources.

Figure 5:
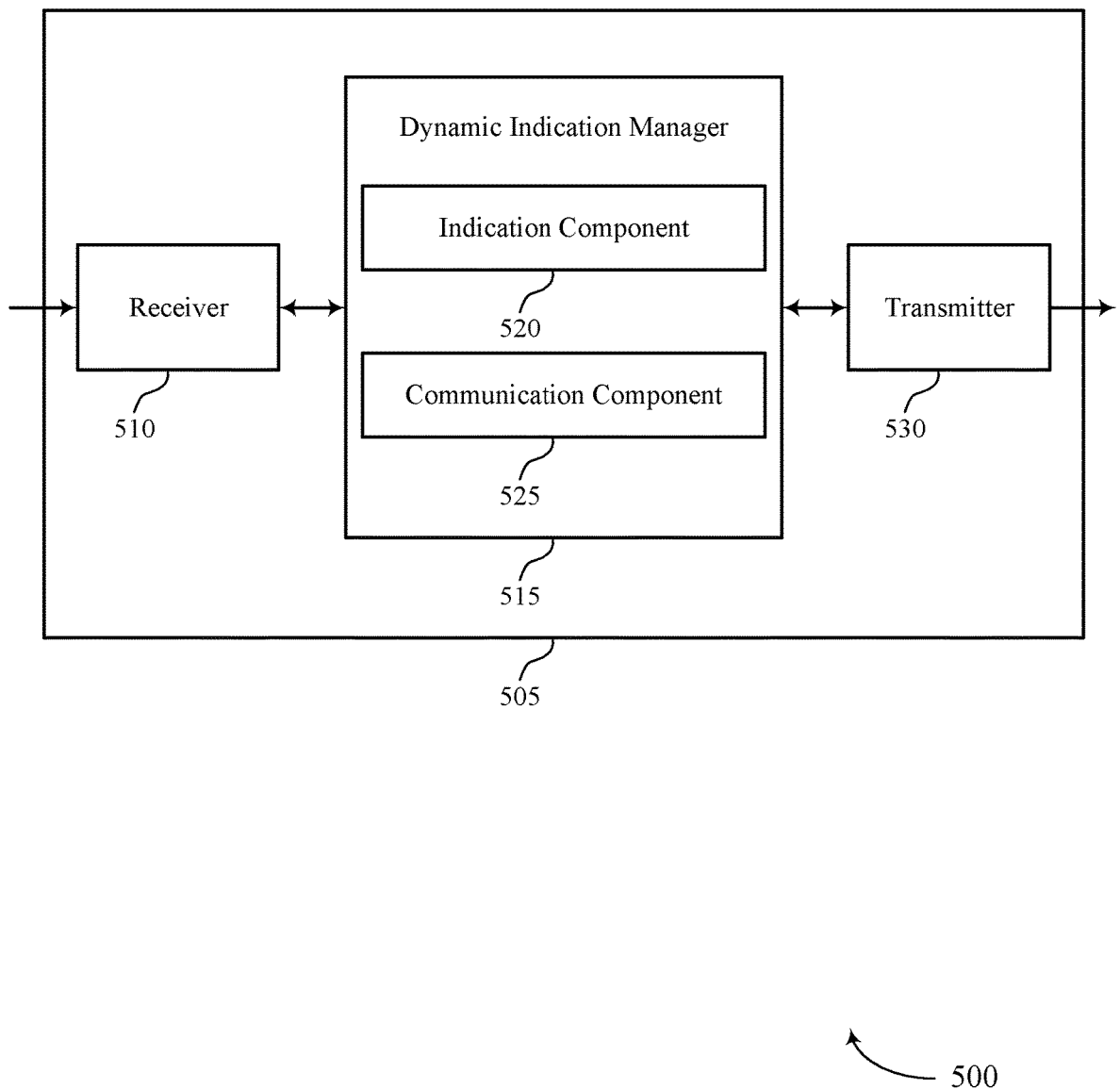

FIG. 5 shows a block diagram 500 of a device 505 that supports indicating communication cancelation based on communication direction indications in accordance with aspects of the present disclosure. The device 505 may be an example of aspects of a device 405, or a UE 115 as described herein. The device 505 may include a receiver 510, a dynamic indication manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to indicating communication cancelation based on communication direction indications, etc.). Information may be passed on to other components of the device 505. The receiver 510 may be an example of aspects of the transceiver 720 described with reference to FIG. 7. The receiver 510 may utilize a single antenna or a set of antennas.

The dynamic indication manager 515 may be an example of aspects of the dynamic indication manager 415 as described herein. The dynamic indication manager 515 may include an indication component 520 and a communication component 525. The dynamic indication manager 515 may be an example of aspects of the dynamic indication manager 710 described herein.

The indication component 520 may receive a first indication associated with the first UE (e.g., a first device), where the first indication indicates a communication direction for the first device for each of a set of time periods for a time interval and receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval.

The communication component 525 may communicate with a base station during the time interval based on the first indication and the second indication.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

A processor of a device (e.g., a UE 115) (e.g., controlling receiver 510, the transmitter 530, or the transceiver 720 as described with reference to FIG. 7) may efficiently operate components of the device as described herein to achieve one or more potential advantages. For example, the processor of the device may operate the receiver 510 to receive an indication of a SFI of the device and another indication such as a cancelation indication (which may be based on a communication direction mismatch between two SFIs associated with the UE or associated with two different UEs). The processor of the device may control the device to communicate with a base station 105 based on the cancelation indication which may improve efficiency and reliability at the device by decreasing interference, and thereby improving battery life of the device.

Figure 6:
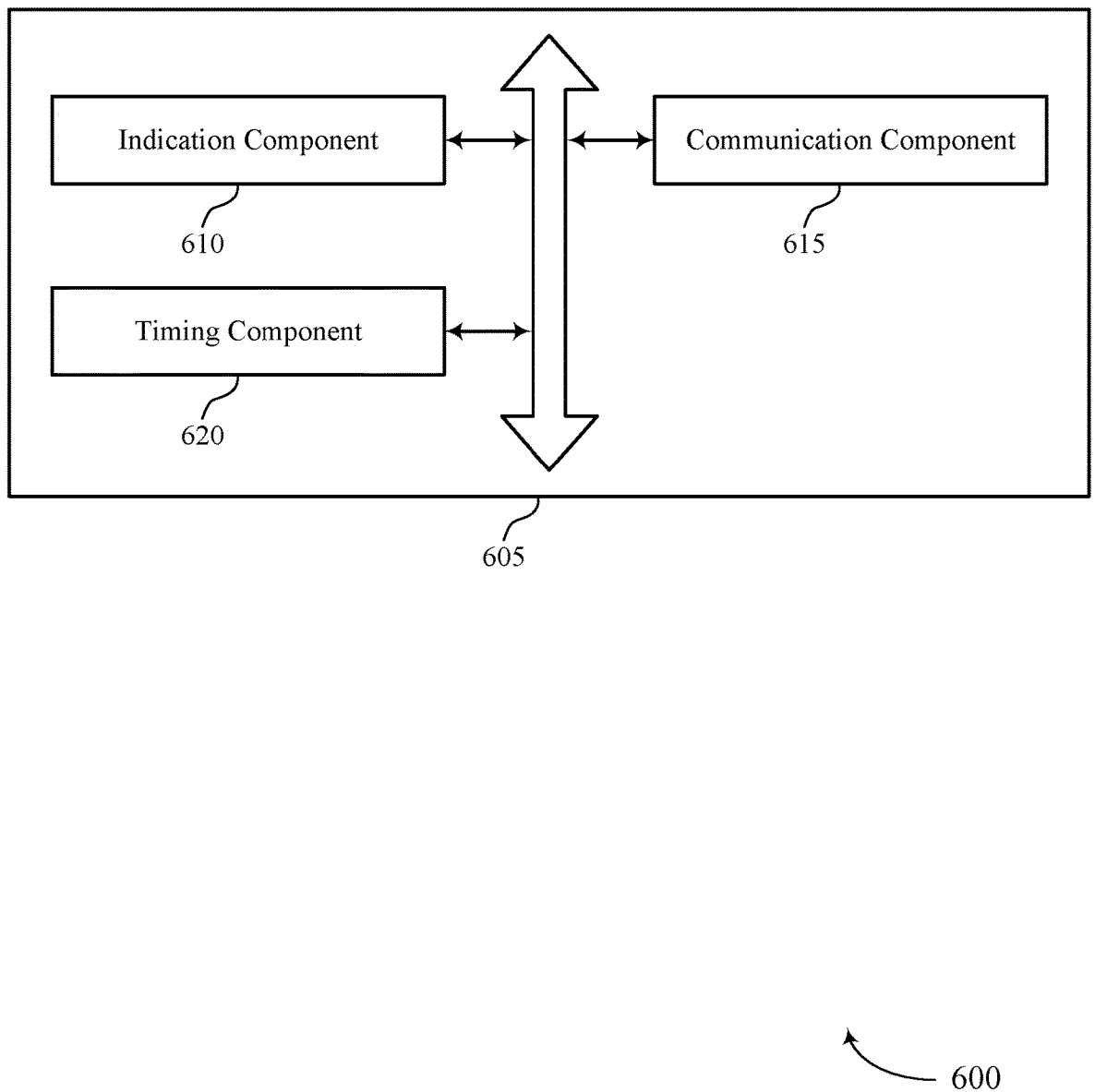
FIG. 6 shows a block diagram of a dynamic indication manager that supports indicating communication cancelation based on communication direction indications in accordance with aspects of the present disclosure.

FIG. 6 shows a block diagram 600 of a dynamic indication manager 605 that supports indicating communication cancelation based on communication direction indications in accordance with aspects of the present disclosure. The dynamic indication manager 605 may be an example of aspects of a dynamic indication manager 415, a dynamic indication manager 515, or a dynamic indication manager 710 described herein. The dynamic indication manager 605 may include an indication component 610, a communication component 615, and a timing component 620. Each of these modules may communicate, directly or indirectly, with one another (e.g., via one or more buses).

The indication component 610 may receive a first indication associated with the first device, where the first indication indicates a communication direction for the first device for each of a set of time periods for a time interval.

In some examples, the indication component 610 may receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval.

In some examples, the indication component 610 may receive a grant scheduling downlink transmissions on the second band for at least the set of time periods based on the second indication.

In some cases, the third indication is associated with a second device. In some cases, the second indication is further based on a beam switch associated with the second device for the set of time periods.

In some cases, the first indication is associated with a first band of the first device, and where the third indication is associated with a second band of the first device.

In some cases, the second indication is further based on a self-interference condition at the first device for at least the set of time periods.

In some cases, the self-interference condition at the first device includes interference between an uplink transmission on the first band and a downlink transmission on the second band for at least the set of time periods, and where the second indication indicates a cancelation of the uplink transmission on the first band for at least the set of time periods.

The communication component 615 may communicate with a base station during the time interval based on the first indication and the second indication.

In some cases, the communication direction for the first device includes an uplink direction, a downlink direction, a flexible symbol, or a gap symbol.

In some cases, the communication direction mismatch includes an uplink direction indicated by the first indication for the set of time periods and a downlink direction indicated by the third indication for the set of time periods.

The timing component 620 may manage the communication timing with a base station. In some cases, the plurality of time periods comprise a plurality of symbols, and the time interval includes a slot. In some cases, the set of time periods includes a set of symbols.

Figure 7:
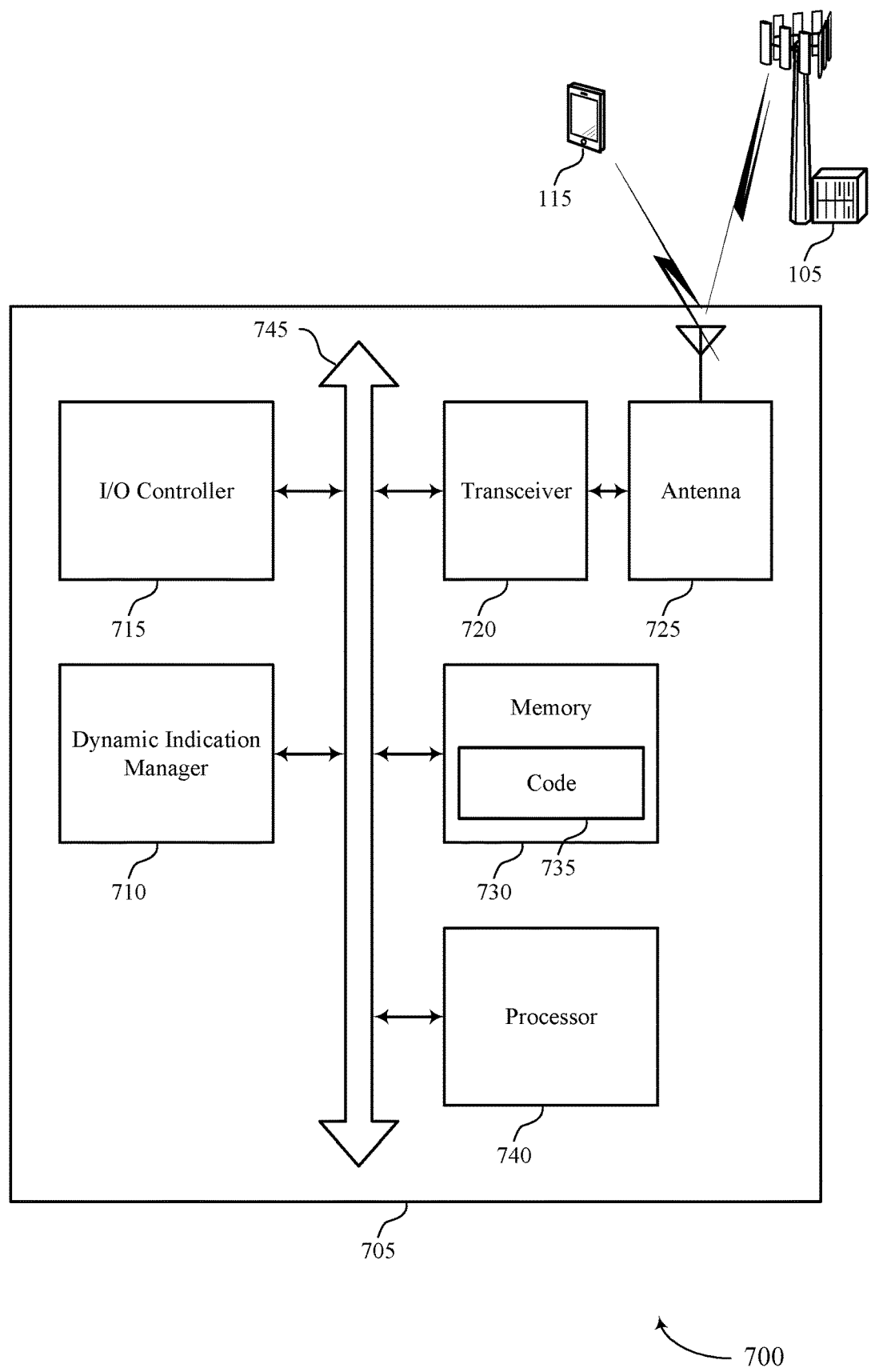
FIG. 7 shows a diagram of a system including a device that supports indicating communication cancelation based on communication direction indications in accordance with aspects of the present disclosure.

FIG. 7 shows a diagram of a system 700 including a device 705 that supports indicating communication cancelation based on communication direction indications in accordance with aspects of the present disclosure. The device 705 may be an example of or include the components of device 405, device 505, or a UE 115 as described herein. The device 705 may include components for bi-directional voice and data communications including components for transmitting and receiving communications, including a dynamic indication manager 710, an I/O controller 715, a transceiver 720, an antenna 725, memory 730, and a processor 740. These components may be in electronic communication via one or more buses (e.g., bus 745).

The dynamic indication manager 710 may receive a first indication associated with the first device, where the first indication indicates a communication direction for the first device for each of a set of time periods for a time interval, receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with a base station during the time interval based on the first indication and the second indication.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting indicating communication cancelation based on communication direction indications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

By including or configuring the dynamic indication manager 710 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability.

Figure 8:
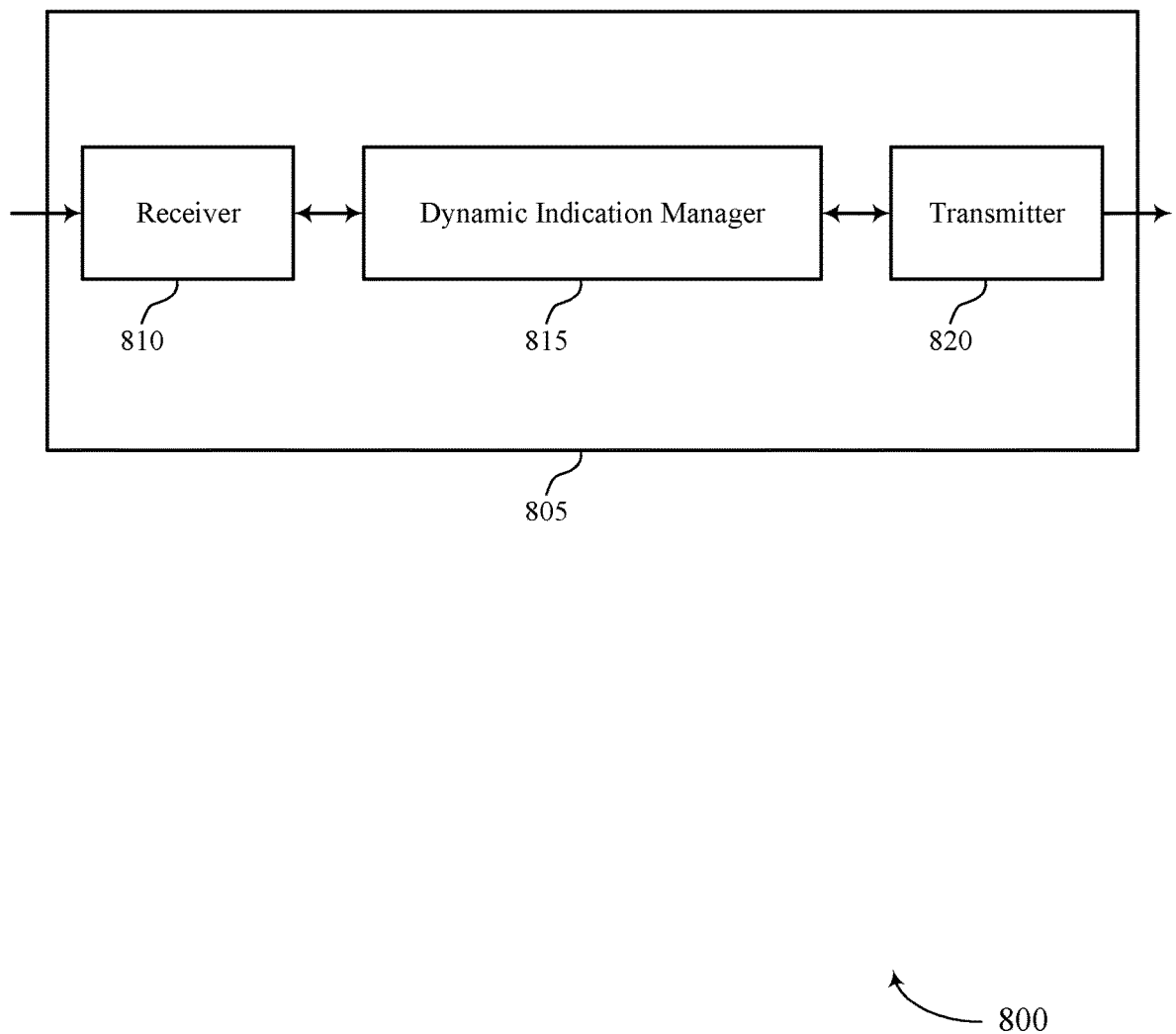
FIGS. 8 and 9 show block diagrams of devices that support indicating communication cancelation based on communication direction indications in accordance with aspects of the present disclosure.

FIG. 8 shows a block diagram 800 of a device 805 that supports indicating communication cancelation based on communication direction indications in accordance with aspects of the present disclosure. The device 805 may be an example of aspects of a base station 105 as described herein. The device 805 may include a receiver 810, a dynamic indication manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to indicating communication cancelation based on communication direction indications, etc.). Information may be passed on to other components of the device 805. The receiver 810 may be an example of aspects of the transceiver 1120 described with reference to FIG. 11. The receiver 810 may utilize a single antenna or a set of antennas.

The dynamic indication manager 815 may transmit a first indication to a first device, where the first indication indicates a communication direction for the first device for each of a set of time periods for a time interval, transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with the first device during the time interval based on the first indication and the second indication. The dynamic indication manager 815 may be an example of aspects of the dynamic indication manager 1110 described herein.

The dynamic indication manager 815, or its sub-components, may be implemented in hardware, code (e.g., software or firmware) executed by a processor, or any combination thereof. If implemented in code executed by a processor, the functions of the dynamic indication manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The dynamic indication manager 815, or its sub-components, may be physically located at various positions, including being distributed such that portions of functions are implemented at different physical locations by one or more physical components. In some examples, the dynamic indication manager 815, or its sub-components, may be a separate and distinct component in accordance with various aspects of the present disclosure. In some examples, the dynamic indication manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the dynamic indication manager 815 in accordance with examples as described herein, the device 805 (e.g., a processor controlling or otherwise coupled to the receiver 810, the transmitter 820, the dynamic indication manager 815, or a combination thereof) may support techniques for reduced processing, reduced power consumption, more efficient utilization of communication resources.

Figure 9:
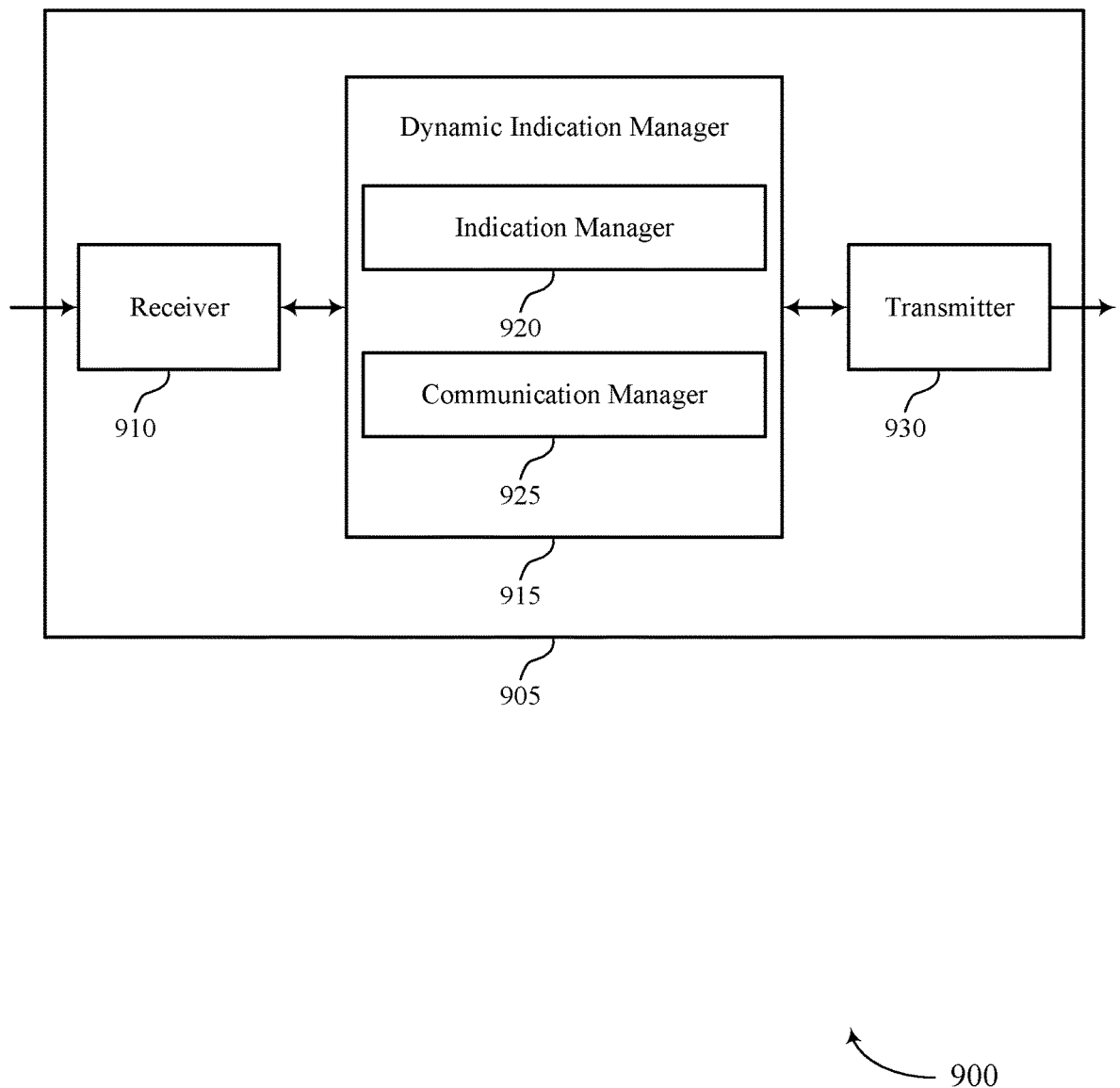

FIG. 9 shows a block diagram 900 of a device 905 that supports indicating communication cancelation based on communication direction indications in accordance with aspects of the present disclosure. The device 905 may be an example of aspects of a device 805, or a base station 105 as described herein. The device 905 may include a receiver 910, a dynamic indication manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to indicating communication cancelation based on communication direction indications, etc.). Information may be passed on to other components of the device 905. The receiver 910 may be an example of aspects of the transceiver 1120 described with reference to FIG. 11. The receiver 910 may utilize a single antenna or a set of antennas.

The dynamic indication manager 915 may be an example of aspects of the dynamic indication manager 815 as described herein. The dynamic indication manager 915 may include an indication manager 920 and a communication manager 925. The dynamic indication manager 915 may be an example of aspects of the dynamic indication manager 1110 described herein.

The indication manager 920 may transmit a first indication to a first device, where the first indication indicates a communication direction for the first device for each of a set of time periods for a time interval and transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval.

The communication manager 925 may communicate with the first device during the time interval based on the first indication and the second indication.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
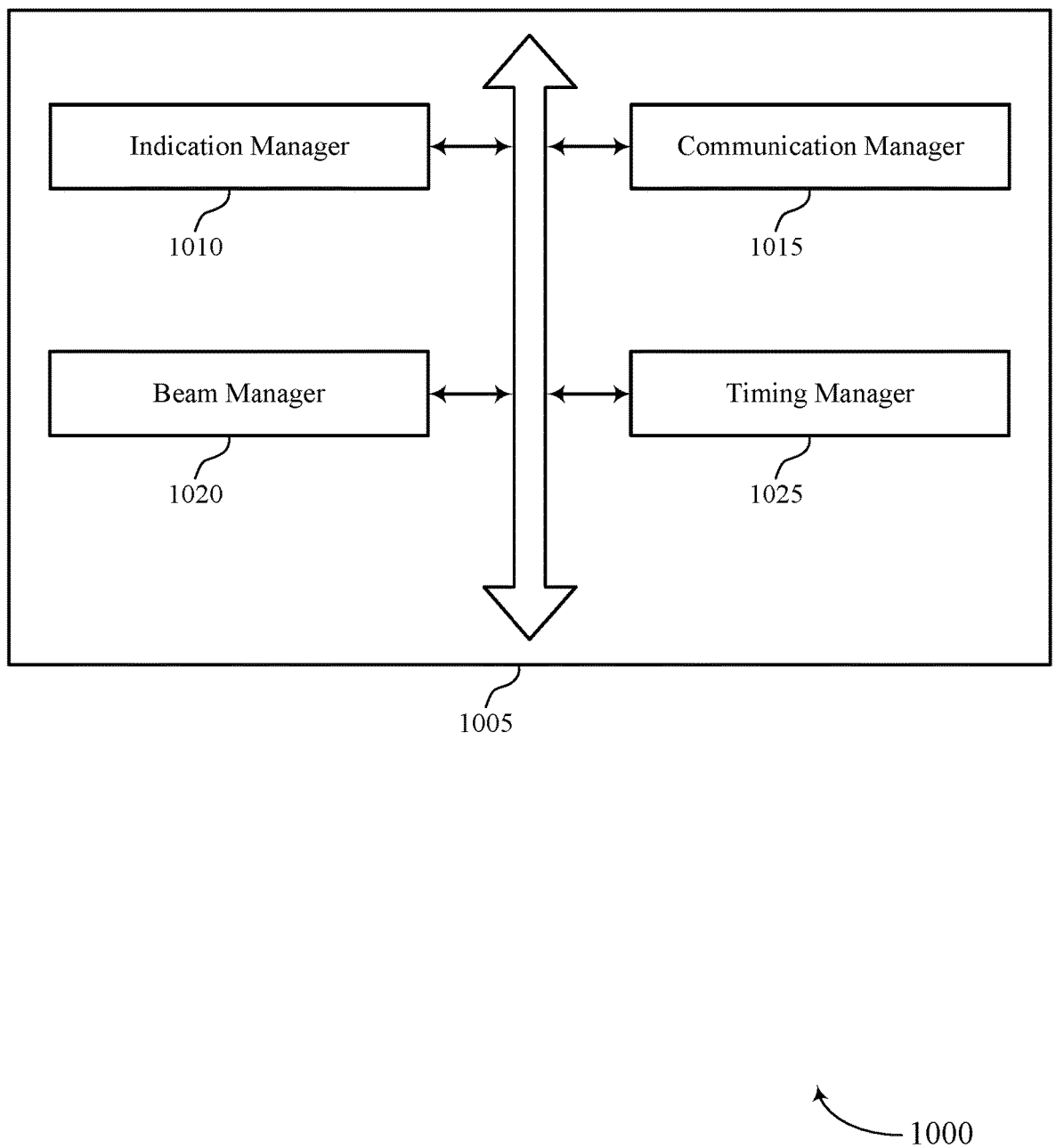
FIG. 10 shows a block diagram of a dynamic indication manager that supports indicating communication cancelation based on communication direction indications in accordance with aspects of the present disclosure.

FIG. 10 shows a block diagram 1000 of a dynamic indication manager 1005 that supports indicating communication cancelation based on communication direction indications in accordance with aspects of the present disclosure. The dynamic indication manager 1005 may be an example of aspects of a dynamic indication manager 815, a dynamic indication manager 915, or a dynamic indication manager 1110 described herein. The dynamic indication manager 1005 may include an indication manager 1010, a communication manager 1015, a beam manager 1020, and a timing manager 1025. Each of these modules may communicate, directly or indirectly, with one another (e.g., via one or more buses).

The indication manager 1010 may transmit a first indication to a first device, where the first indication indicates a communication direction for the first device for each of a set of time periods for a time interval.

In some examples, the indication manager 1010 may transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval.

In some examples, the indication manager 1010 may transmit a grant to the first device scheduling downlink transmissions on the second band for at least the set of time periods based on the second indication.

In some cases, the third indication is associated with a second device. In some cases, the first indication is associated with a first band of the first device, and where the third indication is associated with a second band of the first device. In some cases, the second indication is further based on a self-interference condition at the first device for at least the set of time periods.

In some cases, the self-interference condition at the first device includes interference between an uplink transmission on the first band and a downlink transmission on the second band for at least the set of time periods, and where the second indication indicates a cancelation of the uplink transmission on the first band for at least the set of time periods.

The communication manager 1015 may communicate with the first device during the time interval based on the first indication and the second indication.

In some cases, the communication direction for the first device includes an uplink direction, a downlink direction, a flexible symbol, or a gap symbol.

In some cases, the communication direction mismatch includes an uplink direction indicated by the first indication for the set of time periods and a downlink direction indicated by the third indication for the set of time periods.

The beam manager 1020 may receive a request for a beam change from the second device. In some examples, the beam manager 1020 may grant the request for the beam change for the second device, where transmitting the second indication to the first device is based on granting the request for the beam change for the second device.

The timing manager 1025 may manage the communication timing with a first device and/or a second device. In some cases, the plurality of time periods comprise a plurality of symbols, and the time interval includes a slot. In some cases, the set of time periods includes a set of symbols.

Figure 11:
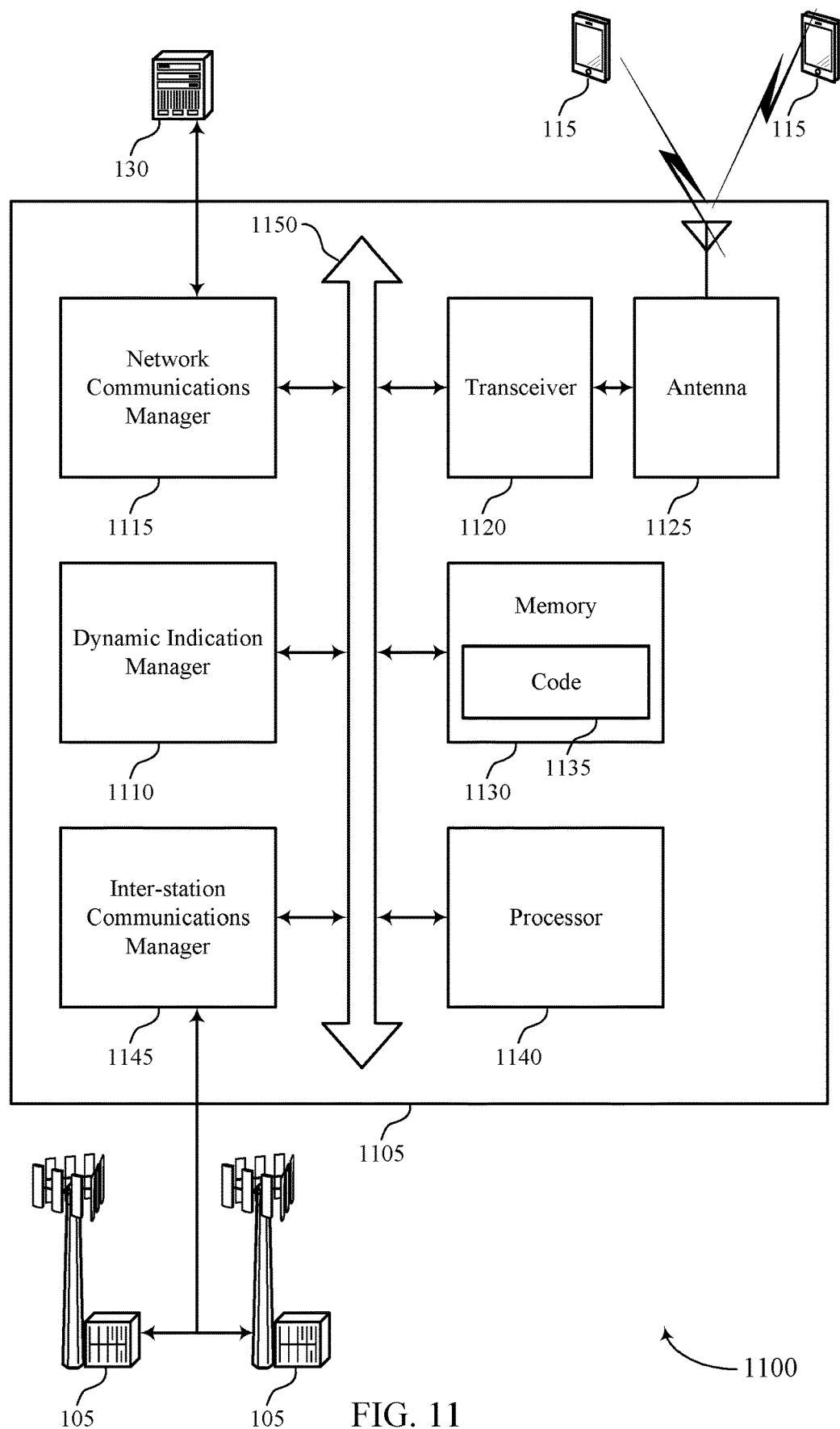
FIG. 11 shows a diagram of a system including a device that supports indicating communication cancelation based on communication direction indications in accordance with aspects of the present disclosure.

FIG. 11 shows a diagram of a system 1100 including a device 1105 that supports indicating communication cancelation based on communication direction indications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a dynamic indication manager 1110, a network communications manager 1115, a transceiver 1120, an antenna 1125, memory 1130, a processor 1140, and an inter-station communications manager 1145. These components may be in electronic communication via one or more buses (e.g., bus 1150).

The dynamic indication manager 1110 may transmit a first indication to a first device, where the first indication indicates a communication direction for the first device for each of a set of time periods for a time interval, transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval, and communicate with the first device during the time interval based on the first indication and the second indication.

The network communications manager 1115 may manage communications with the core network (e.g., via one or more wired backhaul links). For example, the network communications manager 1115 may manage the transfer of data communications for client devices, such as one or more devices (e.g., UEs 115).

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting indicating communication cancelation based on communication direction indications).

The inter-station communications manager 1145 may manage communications with other base station 105, and may include a controller or scheduler for controlling communications with devices (e.g., UEs 115) in cooperation with other base stations 105. For example, the inter-station communications manager 1145 may coordinate scheduling for transmissions to the devices for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the dynamic indication manager 1110 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability.

Figure 12:
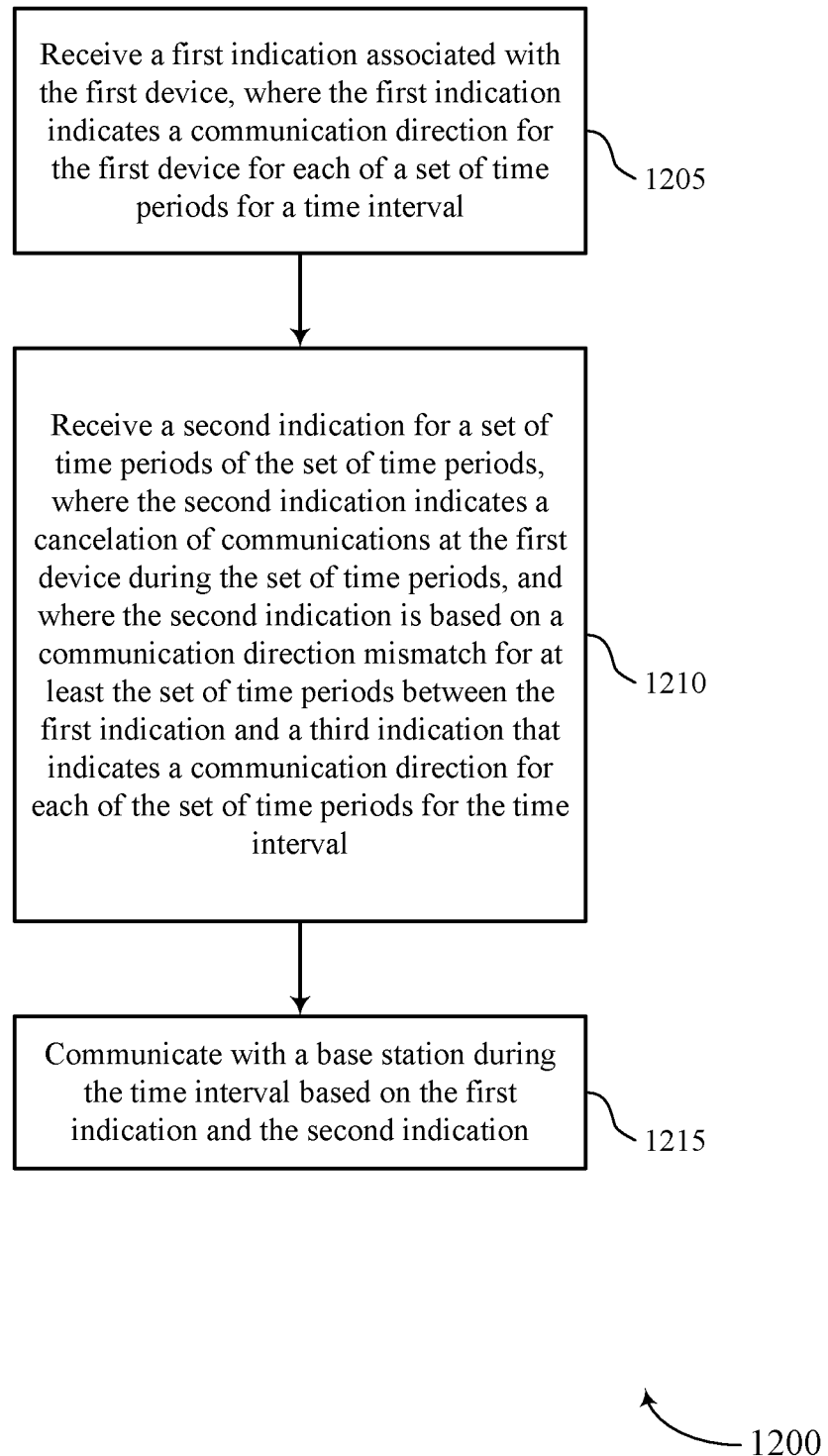
FIGS. 12 through 15 show flowcharts illustrating methods that support indicating communication cancelation based on communication direction indications in accordance with aspects of the present disclosure.

FIG. 12 shows a flowchart illustrating a method 1200 that supports indicating communication cancelation based on communication direction indications in accordance with aspects of the present disclosure. The operations of method 1200 may be implemented by a device (e.g., a UE 115) or its components as described herein. For example, the operations of method 1200 may be performed by a dynamic indication manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1205, the device may receive a first indication associated with the first device, where the first indication indicates a communication direction for the first device for each of a set of time periods for a time interval. The operations of 1205 may be performed according to the methods described herein. In some examples, aspects of the operations of 1205 may be performed by an indication component as described with reference to FIGS. 4 through 7.

At 1210, the device may receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval. The operations of 1210 may be performed according to the methods described herein. In some examples, aspects of the operations of 1210 may be performed by an indication component as described with reference to FIGS. 4 through 7.

At 1215, the device may communicate with a base station during the time interval based on the first indication and the second indication. The operations of 1215 may be performed according to the methods described herein. In some examples, aspects of the operations of 1215 may be performed by a communication component as described with reference to FIGS. 4 through 7.

Figure 13:
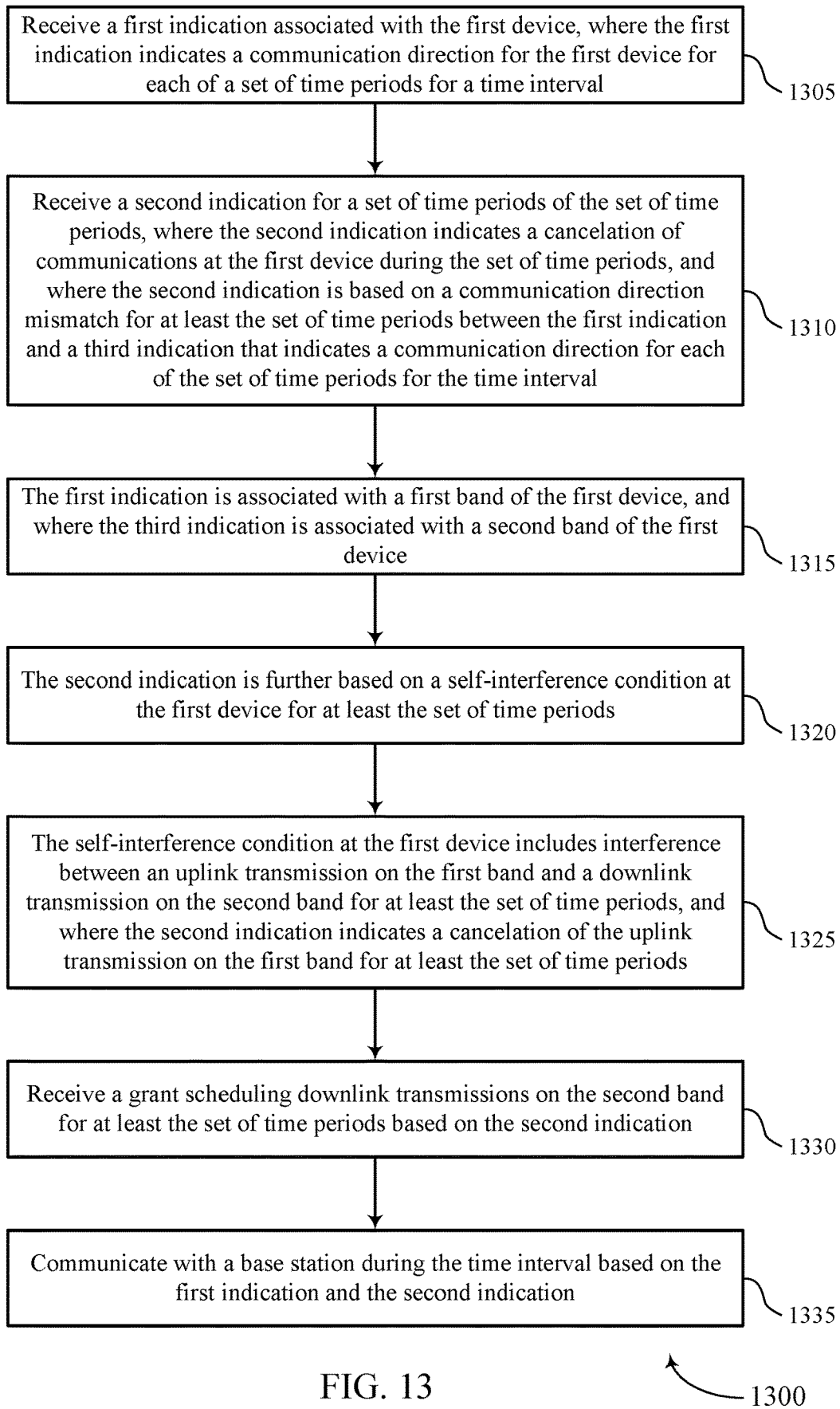

FIG. 13 shows a flowchart illustrating a method 1300 that supports indicating communication cancelation based on communication direction indications in accordance with aspects of the present disclosure. The operations of method 1300 may be implemented by a device (e.g., a UE 115) or its components as described herein. For example, the operations of method 1300 may be performed by a dynamic indication manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1305, the device may receive a first indication associated with the first device, where the first indication indicates a communication direction for the first device for each of a set of time periods for a time interval. The operations of 1305 may be performed according to the methods described herein. In some examples, aspects of the operations of 1305 may be performed by an indication component as described with reference to FIGS. 4 through 7.

At 1310, the device may receive a second indication for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval. The operations of 1310 may be performed according to the methods described herein. In some examples, aspects of the operations of 1310 may be performed by an indication component as described with reference to FIGS. 4 through 7.

At 1315, the device may the first indication is associated with a first band of the first device, and where the third indication is associated with a second band of the first device. The operations of 1315 may be performed according to the methods described herein. In some examples, aspects of the operations of 1315 may be performed by an indication component as described with reference to FIGS. 4 through 7.

At 1320, the device may the second indication is further based on a self-interference condition at the first device for at least the set of time periods. The operations of 1320 may be performed according to the methods described herein. In some examples, aspects of the operations of 1320 may be performed by an indication component as described with reference to FIGS. 4 through 7.

At 1325, the device may the self-interference condition at the first device includes interference between an uplink transmission on the first band and a downlink transmission on the second band for at least the set of time periods, and where the second indication indicates a cancelation of the uplink transmission on the first band for at least the set of time periods. The operations of 1325 may be performed according to the methods described herein. In some examples, aspects of the operations of 1325 may be performed by an indication component as described with reference to FIGS. 4 through 7.

At 1330, the device may receive a grant scheduling downlink transmissions on the second band for at least the set of time periods based on the second indication. The operations of 1330 may be performed according to the methods described herein. In some examples, aspects of the operations of 1330 may be performed by an indication component as described with reference to FIGS. 4 through 7.

At 1335, the device may communicate with a base station during the time interval based on the first indication and the second indication. The operations of 1335 may be performed according to the methods described herein. In some examples, aspects of the operations of 1335 may be performed by a communication component as described with reference to FIGS. 4 through 7.

Figure 14:
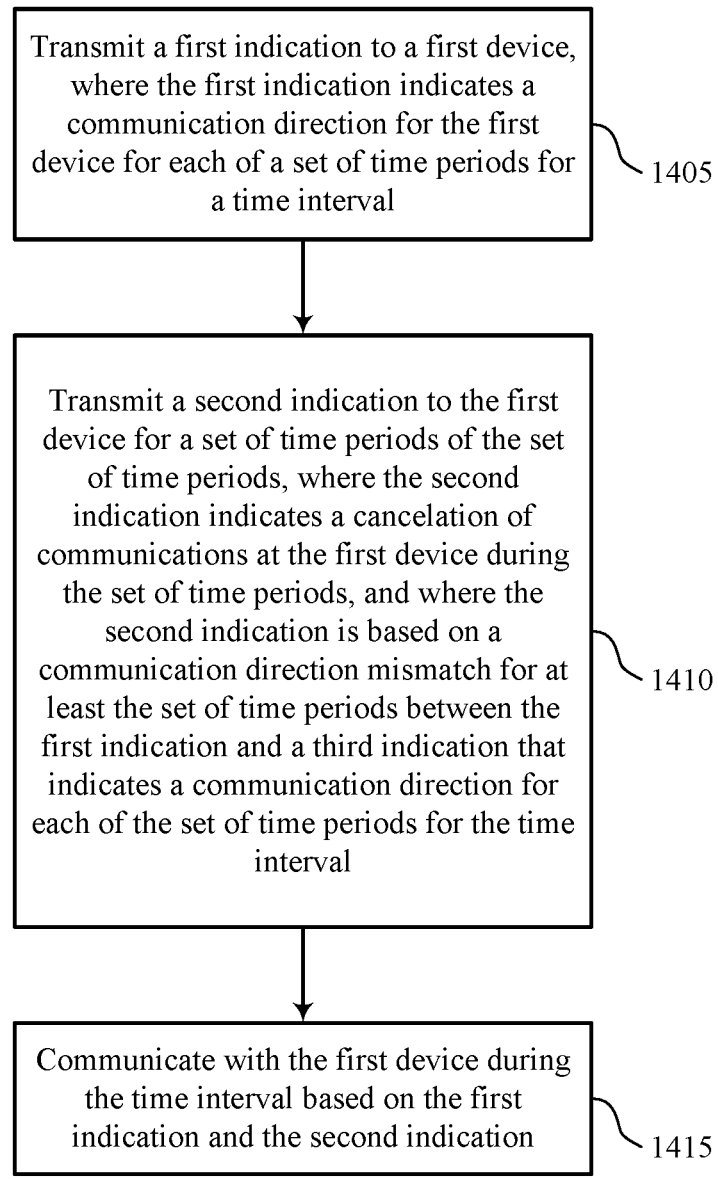

FIG. 14 shows a flowchart illustrating a method 1400 that supports indicating communication cancelation based on communication direction indications in accordance with aspects of the present disclosure. The operations of method 1400 may be implemented by a base station 105 or its components as described herein. For example, the operations of method 1400 may be performed by a dynamic indication manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit a first indication to a first device, where the first indication indicates a communication direction for the first device for each of a set of time periods for a time interval. The operations of 1405 may be performed according to the methods described herein. In some examples, aspects of the operations of 1405 may be performed by an indication manager as described with reference to FIGS. 8 through 11.

At 1410, the base station may transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval. The operations of 1410 may be performed according to the methods described herein. In some examples, aspects of the operations of 1410 may be performed by an indication manager as described with reference to FIGS. 8 through 11.

At 1415, the base station may communicate with the first device during the time interval based on the first indication and the second indication. The operations of 1415 may be performed according to the methods described herein. In some examples, aspects of the operations of 1415 may be performed by a communication manager as described with reference to FIGS. 8 through 11.

Figure 15:
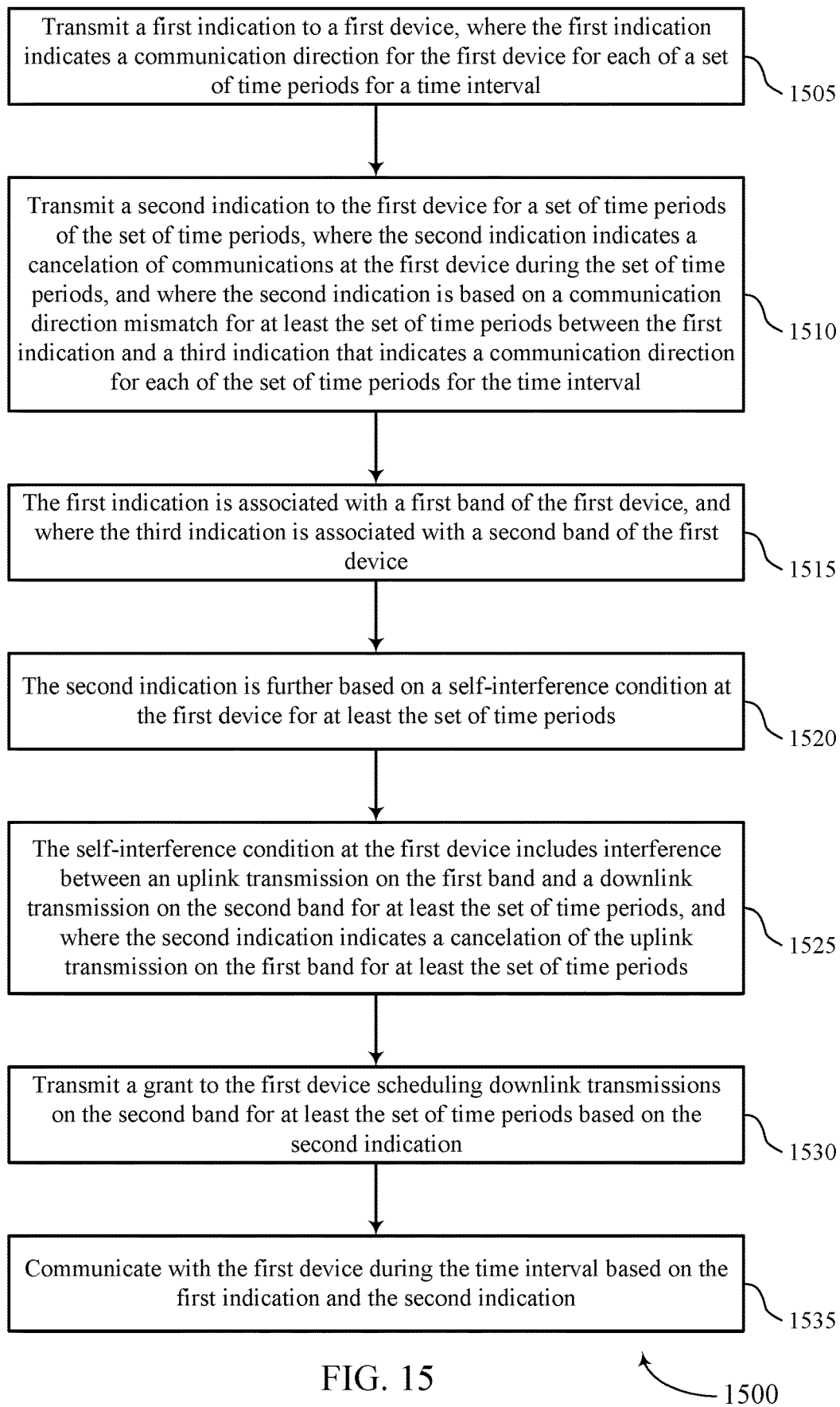

FIG. 15 shows a flowchart illustrating a method 1500 that supports indicating communication cancelation based on communication direction indications in accordance with aspects of the present disclosure. The operations of method 1500 may be implemented by a base station 105 or its components as described herein. For example, the operations of method 1500 may be performed by a dynamic indication manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit a first indication to a first device, where the first indication indicates a communication direction for the first device for each of a set of time periods for a time interval. The operations of 1505 may be performed according to the methods described herein. In some examples, aspects of the operations of 1505 may be performed by an indication manager as described with reference to FIGS. 8 through 11.

At 1510, the base station may transmit a second indication to the first device for a set of time periods of the set of time periods, where the second indication indicates a cancelation of communications at the first device during the set of time periods, and where the second indication is based on a communication direction mismatch for at least the set of time periods between the first indication and a third indication that indicates a communication direction for each of the set of time periods for the time interval. The operations of 1510 may be performed according to the methods described herein. In some examples, aspects of the operations of 1510 may be performed by an indication manager as described with reference to FIGS. 8 through 11.

At 1515, the base station may the first indication is associated with a first band of the first device, and where the third indication is associated with a second band of the first device. The operations of 1515 may be performed according to the methods described herein. In some examples, aspects of the operations of 1515 may be performed by an indication manager as described with reference to FIGS. 8 through 11.

At 1520, the base station may the second indication is further based on a self-interference condition at the first device for at least the set of time periods. The operations of 1520 may be performed according to the methods described herein. In some examples, aspects of the operations of 1520 may be performed by an indication manager as described with reference to FIGS. 8 through 11.

At 1525, the base station may the self-interference condition at the first device includes interference between an uplink transmission on the first band and a downlink transmission on the second band for at least the set of time periods, and where the second indication indicates a cancelation of the uplink transmission on the first band for at least the set of time periods. The operations of 1525 may be performed according to the methods described herein. In some examples, aspects of the operations of 1525 may be performed by an indication manager as described with reference to FIGS. 8 through 11.

At 1530, the base station may transmit a grant to the first device scheduling downlink transmissions on the second band for at least the set of time periods based on the second indication. The operations of 1530 may be performed according to the methods described herein. In some examples, aspects of the operations of 1530 may be performed by an indication manager as described with reference to FIGS. 8 through 11.

At 1535, the base station may communicate with the first device during the time interval based on the first indication and the second indication. The operations of 1535 may be performed according to the methods described herein. In some examples, aspects of the operations of 1535 may be performed by a communication manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device, comprising: receiving a first indication associated with the first device, wherein the first indication indicates a communication direction for the first device for each of a plurality of time periods for a time interval; receiving a second indication for a set of time periods of the plurality of time periods, wherein the second indication indicates a cancelation of communications at the first device during the set of time periods, and wherein the second indication is based at least in part on a communication direction mismatch for at least the set of time periods between the first indication and a third indication that indicates a communication direction for each of the plurality of time periods for the time interval; and communicating with a base station during the time interval based at least in part on the first indication and the second indication.

Aspect 2: The method of aspect 1, wherein the third indication is associated with a second device.

Aspect 3: The method of aspect 2, wherein the second indication is further based at least in part on a beam switch associated with the second device for the set of time periods.

Aspect 4: The method of any of aspects 1 through 3, wherein the first indication is associated with a first band of the first device, and the third indication is associated with a second band of the first device.

Aspect 5: The method of aspect 4, wherein the second indication is further based at least in part on a self-interference condition at the first device for at least the set of time periods.

Aspect 6: The method of aspect 5, wherein the self-interference condition at the first device comprises interference between an uplink transmission on the first band and a downlink transmission on the second band for at least the set of time periods, and the second indication indicates a cancelation of the uplink transmission on the first band for at least the set of time periods.

Aspect 7: The method of aspect 6, further comprising: receiving a grant scheduling downlink transmissions on the second band for at least the set of time periods based at least in part on the second indication.

Aspect 8: The method of any of aspects 1 through 7, wherein the plurality of time periods comprises a plurality of symbols, and the time interval comprises a slot.

Aspect 9: The method of any of aspects 1 through 8, wherein the communication direction for the first device comprises an uplink direction, a downlink direction, a flexible symbol, or a gap symbol.

Aspect 10: The method of any of aspects 1 through 9, wherein the communication direction mismatch comprises an uplink direction indicated by the first indication for the set of time periods and a downlink direction indicated by the third indication for the set of time periods.

Aspect 11: A method for wireless communication at a base station, comprising: transmitting a first indication to a first device, wherein the first indication indicates a communication direction for the first device for each of a plurality of time periods for a time interval; transmitting a second indication to the first device for a set of time periods of the plurality of time periods, wherein the second indication indicates a cancelation of communications at the first device during the set of time periods, and wherein the second indication is based at least in part on a communication direction mismatch for at least the set of time periods between the first indication and a third indication that indicates a communication direction for each of the plurality of time periods for the time interval; and communicating with the first device during the time interval based at least in part on the first indication and the second indication.

Aspect 12: The method of aspect 11, wherein the third indication is associated with a second device.

Aspect 13: The method of aspect 12, further comprising: receiving a request for a beam change from the second device; and granting the request for the beam change for the second device, wherein transmitting the second indication to the first device is based at least in part on granting the request for the beam change for the second device.

Aspect 14: The method of any of aspects 11 through 13, wherein the first indication is associated with a first band of the first device, and the third indication is associated with a second band of the first device.

Aspect 15: The method of aspect 14, wherein the second indication is further based at least in part on a self-interference condition at the first device for at least the set of time periods.

Aspect 16: The method of aspect 15, wherein the self-interference condition at the first device comprises interference between an uplink transmission on the first band and a downlink transmission on the second band for at least the set of time periods, and the second indication indicates a cancelation of the uplink transmission on the first band for at least the set of time periods.

Aspect 17: The method of aspect 16, further comprising: transmitting a grant to the first device scheduling downlink transmissions on the second band for at least the set of time periods based at least in part on the second indication.

Aspect 18: The method of any of aspects 11 through 17, wherein the plurality of time periods comprises a plurality of symbols, and the time interval comprises a slot.

Aspect 19: The method of any of aspects 11 through 18, wherein the communication direction for the first device comprises an uplink direction, a downlink direction, a flexible symbol, or a gap symbol.

Aspect 20: The method of any of aspects 11 through 19, wherein the communication direction mismatch comprises an uplink direction indicated by the first indication for the set of time periods and a downlink direction indicated by the third indication for the set of time periods.

Aspect 21: An apparatus for wireless communication at a first device, comprising a processor; memory coupled with the processor; and instructions stored in the memory and executable by the processor to cause the apparatus to perform a method of any of aspects 1 through 10.

Aspect 22: An apparatus for wireless communication at a first device, comprising at least one means for performing a method of any of aspects 1 through 10.

Aspect 23: A non-transitory computer-readable medium storing code for wireless communication at a first device, the code comprising instructions executable by a processor to perform a method of any of aspects 1 through 10.

Aspect 24: An apparatus for wireless communication at a base station, comprising a processor; memory coupled with the processor; and instructions stored in the memory and executable by the processor to cause the apparatus to perform a method of any of aspects 11 through 20.

Aspect 25: An apparatus for wireless communication at a base station, comprising at least one means for performing a method of any of aspects 11 through 20.

Aspect 26: A non-transitory computer-readable medium storing code for wireless communication at a base station, the code comprising instructions executable by a processor to perform a method of any of aspects 11 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
    receiving a first communication direction indication of a respective uplink communication direction or a respective downlink communication direction for each of a plurality of time periods for a time interval of a first band associated with the first device, wherein the first communication direction indication and a second communication direction indication associated with a second band of the first device different than the first band indicate a communication direction mismatch for one or more time periods of the plurality of time periods;
    receiving, for the one or more time periods of the plurality of time periods, an indication of a cancelation of communications at the first device during the one or more time periods, the indication indicating a cancelation of an uplink transmission on the first band for at least the one or more time periods, wherein the indication of the cancelation of communications is based at least in part on the communication direction mismatch and an interference associated with the communication direction mismatch satisfying a threshold, the interference comprising a self-interference condition at the first device for at least the one or more time periods, wherein the self-interference condition comprises interference between the uplink transmission on the first band and a downlink transmission on the second band, and wherein the second communication direction indication indicates a respective uplink communication direction or a respective downlink communication direction for each of the one or more time periods that is different from the respective uplink communication direction or the respective downlink communication direction indicated by the first communication direction indication;
    receiving a grant scheduling downlink transmissions on the second band for at least the one or more time periods based at least in part on the indication of the cancelation of communications; and
    communicating with a network entity during the time interval based at least in part on the first communication direction indication and the indication of the cancelation of communications.

2. The method of claim 1, wherein the indication of the cancelation of communications is further based at least in part on the self-interference condition at the first device for at least the one or more time periods.

3. The method of claim 1, wherein the plurality of time periods comprises a plurality of symbols, and wherein the time interval comprises a slot.

4. The method of claim 1, wherein:
    the communication direction mismatch comprises an uplink direction indicated by the first communication direction indication for the one or more time periods and a downlink direction indicated by the second communication direction indication for the one or more time periods; and
    receiving the indication of the cancelation of communications at the first device is based at least in part on the uplink direction indicated by the first communication direction indication being different from the downlink direction indicated by the second communication direction indication.

5. The method of claim 1, wherein:
    the first device is operating in a full-duplex mode; and
    the indication of the cancelation of communications is further based at least in part on a first beam used by the first device for transmitting during at least the one or more time periods, a second beam used by the first device for receiving during at least the one or more time periods, or both.

6. A method for wireless communication at a network entity, comprising:
    transmitting a first communication direction indication to a first device of a respective an uplink communication direction or respective a downlink communication direction for each of a plurality of time periods for a time interval of a first band associated with the first device, wherein the first communication direction indication and a second communication direction indication associated with a second band of the first device different than the first band indicate a communication direction mismatch for one or more time periods of the plurality of time periods;

transmitting, for the one or more time periods of the plurality of time periods, an indication to the first device that indicates a cancelation of communications at the first device during the one or more time periods, the indication indicating a cancelation of an uplink transmission on the first band for at least the one or more time periods, wherein the indication of the cancelation of communications is based at least in part on the communication direction mismatch and an interference associated with the communication direction mismatch satisfying a threshold, the interference comprising a self-interference condition at the first device for at least the one or more time periods, wherein the self-interference condition comprises interference between the uplink transmission on the first band and a downlink transmission on the second band, and wherein the second communication direction indication indicates a respective uplink communication direction or a respective downlink communication direction for each of the one or more time periods that is different from the respective uplink communication direction or the respective downlink communication direction indicated by the first communication direction indication;

transmitting a grant to the first device scheduling downlink transmissions on the second band for at least the one or more time periods based at least in part on the indication of the cancelation of communications; and communicating with the first device during the time interval based at least in part on the first communication direction indication and the indication of the cancelation of communications.

7. The method of claim 6, wherein the indication of the cancelation of communications is further based at least in part on the self-interference condition at the first device for at least the one or more time periods.

8. The method of claim 6, wherein the plurality of time periods comprises a plurality of symbols, and wherein the time interval comprises a slot.

9. The method of claim 6, wherein:
the communication direction mismatch comprises an uplink direction indicated by the first communication direction indication for the one or more time periods and a downlink direction indicated by the second communication direction indication for the one or more time periods; and
transmitting the indication of the cancelation of communications at the first device is based at least in part on the uplink direction indicated by the first communication direction indication being different from the downlink direction indicated by the second communication direction indication.

10. An apparatus for wireless communication at a first device, comprising:
a processor,
memory coupled with the processor; and
instructions stored in the memory and executable by the processor to cause the apparatus to:
receive a first communication direction indication of a respective uplink communication direction or a respective downlink communication direction for each of a plurality of time periods for a time interval of a first band associated with the first device, wherein the first communication direction indication and a second communication direction indication associated with a second band of the first device different than the first band indicate a communication direction mismatch for one or more time periods of the plurality of time periods;

receive, for the one or more time periods of the plurality of time periods, an indication of a cancelation of communications at the first device during the one or more time periods, the indication indicating a cancelation of an uplink transmission on the first band for at least the one or more time periods, wherein the indication of the cancelation of communications is based at least in part on the communication direction mismatch and an interference associated with the communication direction mismatch satisfying a threshold, the interference comprising a self-interference condition at the first device for at least the one or more time periods, wherein the self-interference condition comprises interference between the uplink transmission on the first band and a downlink transmission on the second band, and wherein the second communication direction indication indicates a respective uplink communication direction or a respective downlink communication direction for each of the one or more time periods that is different from the respective uplink communication direction or the respective downlink communication direction indicated by the first communication direction indication;

receive a grant scheduling downlink transmissions on the second band for at least the one or more time periods based at least in part on the indication of the cancelation of communications; and communicate with a network entity during the time interval based at least in part on the first communication direction indication and the indication of the cancelation of communications.

11. The apparatus of claim 10, wherein the indication of the cancelation of communications is further based at least in part on the self-interference condition at the first device for at least the one or more time periods.

12. The apparatus of claim 10, wherein the plurality of time periods comprises a plurality of symbols, and wherein the time interval comprises a slot.

13. The apparatus of claim 10, wherein:
the communication direction mismatch comprises an uplink direction indicated by the first communication direction indication for the one or more time periods and a downlink direction indicated by the second communication direction indication for the one or more time periods; and
the instructions to receive the indication of the cancelation of communications at the first device are based at least in part on the uplink direction indicated by the first communication direction indication being different from the downlink direction indicated by the second communication direction indication.

14. An apparatus for wireless communication at a network entity, comprising:
a processor,
memory coupled with the processor; and
instructions stored in the memory and executable by the processor to cause the apparatus to:

transmit a first communication direction indication to a first device of a respective an uplink communication direction or a respective downlink communication direction for each of a plurality of time periods for a time interval of a first band associated with the first device, wherein the first communication direction indication and a second communication direction indication associated with a second band of the first device different than the first band indicate a communication direction mismatch for one or more time periods of the plurality of time periods;

transmit, for the one or more time periods of the plurality of time periods, an indication to the first device that indicates a cancelation of communications at the first device during the one or more time periods, the indication indicating a cancelation of an uplink transmission on the first band for at least the one or more time periods, wherein the indication of the cancelation of communications is based at least in part on the communication direction mismatch and an interference associated with the communication direction mismatch satisfying a threshold, the interference comprising a self-interference condition at the first device for at least the one or more time periods, wherein the self-interference condition comprises interference between the uplink transmission on the first band and a downlink transmission on the second band, and wherein the second communication direction indication indicates a respective uplink communication direction or a respective downlink communication direction for each of the one or more time periods that is different from the respective uplink communication direction or the respective downlink communication direction indicated by the first communication direction indication;

transmit a grant to the first device scheduling downlink transmissions on the second band for at least the one or more time periods based at least in part on the indication of the cancelation of communications; and communicate with the first device during the time interval based at least in part on the first communication direction indication and the indication of the cancelation of communications.

15. The apparatus of claim 14, wherein the indication of the cancelation of communications is further based at least in part on the self-interference condition at the first device for at least the one or more time periods.

16. The apparatus of claim 14, wherein the plurality of time periods comprises a plurality of symbols, and wherein the time interval comprises a slot.

17. The apparatus of claim 14, wherein:

the communication direction mismatch comprises an uplink direction indicated by the first communication direction indication for the one or more time periods and a downlink direction indicated by the second communication direction indication for the one or more time periods; and the instructions to transmit the indication of the cancelation of communications at the first device are based at least in part on the uplink direction indicated by the first communication direction indication being different from the downlink direction indicated by the second communication direction indication.

\* \* \* \* \*